US011459127B2

(12) United States Patent
Duong et al.

(10) Patent No.: US 11,459,127 B2
(45) Date of Patent: Oct. 4, 2022

(54) INTEGRATED THERMAL ENERGY TRANSPORT AND STORAGE STRUCTURES

(71) Applicant: Raytheon Company, Waltham, MA (US)

(72) Inventors: Tuan L. Duong, Santa Barbara, CA (US); Avram Bar-Cohen, Bethesda, MD (US)

(73) Assignee: Raytheon Company, Waltham, MA (US)

( * ) Notice: Subject to any disclaimer, the term of this patent is extended or adjusted under 35 U.S.C. 154(b) by 421 days.

(21) Appl. No.: 16/538,002

(22) Filed: Aug. 12, 2019

(65) Prior Publication Data
US 2020/0002026 A1    Jan. 2, 2020

Related U.S. Application Data

(63) Continuation-in-part of application No. 16/385,546, filed on Apr. 16, 2019.
(Continued)

(51) Int. Cl.
*B64G 1/10* (2006.01)
*B64G 1/50* (2006.01)
(Continued)

(52) U.S. Cl.
CPC ............. *B64G 1/1078* (2013.01); *B64G 1/50* (2013.01); *F28D 15/0241* (2013.01);
(Continued)

(58) Field of Classification Search
CPC ..... B64G 1/1078; B64G 1/50; F28D 15/0241; F28D 2021/0021; F28F 21/08; F28F 5/00;
(Continued)

(56) References Cited

U.S. PATENT DOCUMENTS 3,536,278 A    10/1970  Walley
3,903,699 A     9/1975  Davis
(Continued)

FOREIGN PATENT DOCUMENTS

CN    108791962 A    11/2018
EP      0822139 A1    2/1998
(Continued)

OTHER PUBLICATIONS

JP2001263971A mt (Year: 2001).*
(Continued)

*Primary Examiner* — Gordon A Jones

(57) ABSTRACT

An apparatus includes a structure configured to receive and transport thermal energy. The structure includes one or more materials configured to undergo a solid-solid phase transformation at a specified temperature or in a specified temperature range. The one or more materials form a heat input region configured to receive the thermal energy and a cold sink interface region configured to reject the thermal energy. The structure also includes one or more thermal energy transfer devices embedded in at least part of the one or more materials. The one or more thermal energy transfer devices are configured to transfer the thermal energy throughout the one or more materials and at least partially between the heat input region and the cold sink interface region. The one or more materials are also configured to absorb and store excess thermal energy in response to a temperature excursion associated with a thermal transient event and to release the stored thermal energy after the thermal transient event.

20 Claims, 12 Drawing Sheets

Related U.S. Application Data

(60) Provisional application No. 62/718,168, filed on Aug. 13, 2018, provisional application No. 62/658,932, filed on Apr. 17, 2018.

(51) Int. Cl.
*F28F 21/08* (2006.01)
*F28D 15/02* (2006.01)
*F28F 5/00* (2006.01)

(52) U.S. Cl.
CPC ............... *F28F 21/08* (2013.01); *F28F 5/00* (2013.01); *F28F 2255/02* (2013.01); *F28F 2270/00* (2013.01)

(58) Field of Classification Search
CPC .... F28F 2255/02; F28F 2270/00; F28F 13/00; F28F 2255/04
See application file for complete search history.

(56) References Cited

U.S. PATENT DOCUMENTS

| | | |
|---|---|---|
| 4,162,701 A | 7/1979 | Ollendorf |
| 5,241,950 A | 9/1993 | Mahdjuri-Sabet |
| 5,732,765 A | 3/1998 | Drolen et al. |
| 5,743,325 A | 4/1998 | Esposto |
| 6,080,962 A | 6/2000 | Lee |
| 6,439,297 B1 | 8/2002 | Dunbar et al. |
| 6,511,021 B1 | 1/2003 | Keramidas |
| 6,899,170 B2 | 5/2005 | Biter et al. |
| 6,997,241 B2 | 2/2006 | Chou et al. |
| 7,028,953 B2 | 4/2006 | Sebata et al. |
| 7,080,681 B2 | 7/2006 | Wert |
| 7,544,257 B2 | 6/2009 | Johnson et al. |
| 7,759,664 B2 | 7/2010 | Marks et al. |
| 8,864,073 B1 | 10/2014 | Kim et al. |
| 8,919,426 B2 | 12/2014 | Hardesty |
| 10,228,197 B2 | 3/2019 | Cognata et al. |
| 2003/0051857 A1 | 3/2003 | Cluzet et al. |
| 2008/0257525 A1 | 10/2008 | Ohnishi et al. |
| 2009/0171294 A1 | 7/2009 | Johnson et al. |
| 2014/0224939 A1 | 8/2014 | Wong et al. |
| 2017/0160021 A1 | 6/2017 | Cognata et al. |
| 2019/0315500 A1 | 10/2019 | Duong et al. |
| 2019/0315501 A1 | 10/2019 | Duong et al. |

FOREIGN PATENT DOCUMENTS

| | | |
|---|---|---|
| EP | 2941611 A1 | 11/2015 |
| GB | 2315854 A | 2/1998 |
| JP | 2001263971 A | 9/2001 |
| JP | 2010216712 A | 9/2010 |

OTHER PUBLICATIONS

Bertagne, "Variable Geometry Radiators Using Shape Memory Alloys," National Aeronautics and Space Administration, Dec. 2014, 1 page.

Blanc et al., "Solar Array Root Hinge Based on Shape Memory Alloy (SMA) Actuator," 15th European Space Mechanisms & Tribology Symposium—ESMATS 2013, Sep. 2013, 8 pages.

National Aeronautics and Space Administration, "Small Spacecraft Technology State of the Art," NASA/TP 2015 216648/REV 1, Ames Research Center, Dec. 2015, 176 pages.

EoPortal News, "SENSE (Space Environmental NanoSatellite Experiment)," Satellite Missions—eoPortal Directory, 2002, 17 pages.

Techport, "Variable Geometry Radiators Using Shape Memory Alloys," NASA Space Technology Research Grants, 2014-2016, 3 pages.

Thermal Management Technologies, "Thermally Efficient Deployable Radiators," TMT Fact Sheet, 2012, 2 pages.

Walgren et al., "Development and Testing of a Shape Memory Alloy-Driven Composite Morphing Radiator," Shape Memory & Superelasticity Technology, ASM International, Nov. 2017, 24 pages.

International Search Report and Written Opinion of the International Searching Authority for International Patent Application No. PCT/US2019/027899 dated Jul. 15, 2019, 11 pages.

International Search Report and Written Opinion of the International Searching Authority for International Patent Application No. PCT/US2019/027700 dated Jul. 22, 2019, 11 pages.

Sharar et al., "Solid-State Thermal Energy Storage Using Reversible Martensitic Transformations," Applied Physics Letters, vol. 114, Apr. 2019, 22 pages.

International Search Report and Written Opinion of the International Searching Authority in connection with International Patent Application No. PCT/US2020/025303 dated Jul. 15, 2020, 11 pages.

Office Action dated Dec. 24, 2021 in connection with U.S. Appl. No. 16/385,546, 15 pages.

* cited by examiner

INTEGRATED THERMAL ENERGY TRANSPORT AND STORAGE STRUCTURES

CROSS-REFERENCE TO RELATED APPLICATIONS AND PRIORITY CLAIM

This application claims priority under 35 U.S.C. § 120 as a continuation-in-part of U.S. patent application Ser. No. 16/385,546 filed on Apr. 16, 2019, which claims priority under 35 U.S.C. § 119(e) to U.S. Provisional Patent Application No. 62/658,932 filed on Apr. 17, 2018 and U.S. Provisional Patent Application No. 62/718,168 filed on Aug. 13, 2018. All of these applications are hereby incorporated by reference in their entirety.

TECHNICAL FIELD

This disclosure is generally directed to thermal management systems. More specifically, this disclosure is directed to integrated thermal energy transport and storage structures.

BACKGROUND

Various flight vehicles, such as satellites that are deployed in space, have highly-constrained size, weight, and power (SWaP) requirements. For example, the design of a satellite often must meet restrictions placed on the size, weight, and power of the satellite in order to ensure proper delivery of the satellite into a desired orbit and to ensure proper operation of the satellite once deployed. These requirements can make packaging electronics into a flight vehicle very challenging. Among other things, a system-level thermal budget identifies the maximum amount of thermal energy (heat) that can be generated by components in a flight vehicle and removed by a thermal management system of the flight vehicle. The thermal budget can therefore limit the payload carried by the flight vehicle and the power density of those electronics.

SUMMARY

This disclosure provides integrated thermal energy transport and storage structures.

In a first embodiment, an apparatus includes a structure configured to receive and transport thermal energy. The structure includes one or more materials configured to undergo a solid-solid phase transformation at a specified temperature or in a specified temperature range. The one or more materials form a heat input region configured to receive the thermal energy and a cold sink interface region configured to reject the thermal energy. The structure also includes one or more thermal energy transfer devices embedded in at least part of the one or more materials. The one or more thermal energy transfer devices are configured to transfer the thermal energy throughout the one or more materials and at least partially between the heat input region and the cold sink interface region. The one or more materials are also configured to absorb and store excess thermal energy in response to a temperature excursion associated with a thermal transient event and to release the stored thermal energy after the thermal transient event.

In a second embodiment, a system includes a flight vehicle having at least one heat source and one or more structures configured to remove thermal energy from the at least one heat source. Each of the one or more structures includes one or more materials configured to undergo a solid-solid phase transformation at a specified temperature or in a specified temperature range. The one or more materials form a heat input region configured to receive the thermal energy and a cold sink interface region configured to reject the thermal energy. Each of the one or more structures also includes one or more thermal energy transfer devices embedded in at least part of the one or more materials. The one or more thermal energy transfer devices are configured to transfer the thermal energy throughout the one or more materials and at least partially between the heat input region and the cold sink interface region. The one or more materials are also configured to absorb and store excess thermal energy in response to a temperature excursion associated with a thermal transient event and to release the stored thermal energy after the thermal transient event.

In a third embodiment, a method includes receiving thermal energy at a structure, where the structure includes one or more materials configured to undergo a solid-solid phase transformation at a specified temperature or in a specified temperature range. The one or more materials form a heat input region configured to receive the thermal energy and a cold sink interface region configured to reject the thermal energy. The method also includes transferring the thermal energy throughout the one or more materials and between the heat input region and the cold sink interface region using one or more thermal energy transfer devices embedded in at least part of the one or more materials. The method further includes, in response to a temperature excursion associated with a thermal transient event, absorbing and storing excess thermal energy in the one or more materials. In addition, the method includes, after the thermal transient event, releasing the stored thermal energy from the one or more materials.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
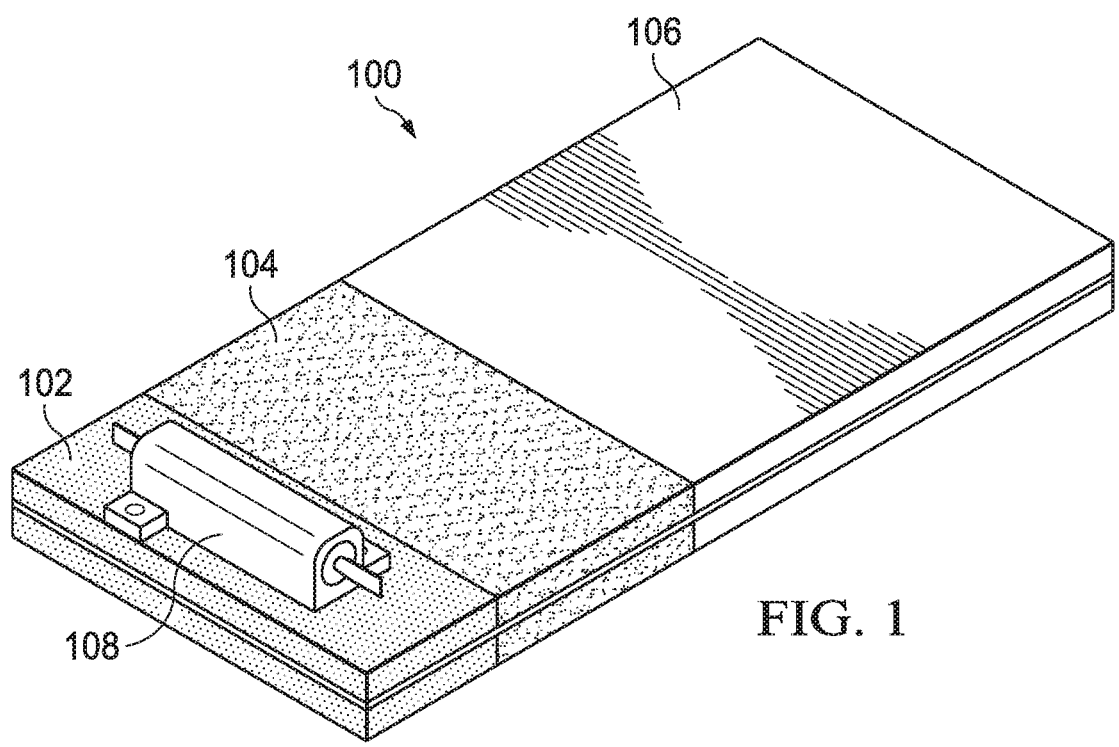
FIG. 1 illustrates a first example integrated thermal energy transport and storage structure in accordance with this disclosure.

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, flight vehicles, such as satellites deployed for use in space, often have highly-constrained size, weight, and power (SWaP) requirements. Unfortunately, this can be problematic when large spikes in thermal energy need to be handled, such as when high-power electronic devices operate intermittently or when intermittent solar loading occurs. Some prior approaches accommodate such thermal transients by over-designing steady-state cooling mechanisms, which increases their size, weight, and power. Other approaches use distinct structural, thermal energy transport, and thermal energy storage components, which again increases the size, weight, and power of a thermal management system.

Still other prior approaches use solid-to-liquid phase change materials to absorb thermal energy spikes and subsequently release stored energy during more advantageous time periods. These types of approaches often use materials such as organic materials (like paraffin wax), inorganic materials (like salt hydrate), and low melting temperature metals (like solder or indium alloy) to absorb and temporarily store excess thermal energy. However, these approaches typically require the use of thermally-conductive elements to transport thermal energy, since many solid-to-liquid phase change materials are relatively poor thermal conductors. While metal-based solid-to-liquid phase change materials like solder or indium alloy are more thermally conductive, their higher densities can limit use in weight-sensitive applications, such as applications where a system's center-of-gravity is precisely defined or controlled. In addition, due to their relatively low thermal conductivities, fragile solid phases, and unstructured liquid phases, it is often necessary to employ thermally conductive matrices (such as combining fins, foams, and/or lattice elements) to contain, mechanically support, and aid the bulk thermal performance of the solid-to-liquid phase change materials. This increases the size and weight of an overall system and significantly increases the overall thermal resistance between a heat source and a heat sink.

This disclosure provides various integrated structures that support both thermal energy transport and thermal energy storage. As described in more detail below, one or more shape-memory alloys or other shape-memory material(s) are integrated with one or more oscillating heat pipes or other thermal energy transfer mechanism(s). Each thermal energy transfer mechanism can be used to transfer thermal energy between locations, such as between one or more heat sources and one or more heat sinks. The shape-memory material or materials allow the thermal energy to enter into and exit the thermal energy transfer mechanism(s). If and when the amount of thermal energy entering into an integrated structure exceeds the thermal energy rejection capability of the structure (such as during a temperature excursion associated with a thermal transient event), the excess thermal energy can be stored temporarily in the shape-memory material(s) of the integrated structure through a solid-to-solid phase transition of the shape-memory material(s). Once the transient event concludes, the stored thermal energy can be provided to the thermal energy transfer mechanism(s) for transport to the one or more heat sinks, and/or the stored thermal energy can be transported by the shape-memory material(s) to the one or more heat sinks.

Materials like copper-aluminum-nickel (CuAlNi) alloys and nickel-titanium (NiTi) alloys exhibit the ability to undergo a solid-solid phase transformation, meaning at least the microstructure of a material can absorb heat and change phase in response to an elevated temperature above a transition temperature of the material. Depending on the implementation, this may or may not result in a visible change in the macrostructure of the material. Also, materials like CuAlNi alloys and NiTi alloys have the potential to be utilized as self-contained energy storage and transport devices by exploiting a combination of their solid-solid phase transformations and their moderately-high thermal conductivities. Within the context of cooling systems, however, shape-memory materials are often precluded from use as a primary heat transport element since their thermal conductivities are far inferior to more thermally conductive metals like aluminum and copper. In accordance with this disclosure, integrating one or more thermal energy transfer mechanisms into one or more shape-memory materials helps to significantly increase the thermal conductivity of the resulting structure compared to the thermal conductivity of the shape-memory material itself.

In some embodiments, the availability of thermal energy storage within an integrated structure allows electronics or other components to operate with a non-constant "duty-cycle." For example, during this non-constant duty-cycle, electronics can generate more than an average amount of heat for at least one part of the duty-cycle and less than the average amount of heat for at least one other part of the duty-cycle. The more-than-average heat generation by the electronics may exceed the amount of thermal energy that can be rejected by the integrated structure at a given time. The thermal storage capability therefore allows higher-than-average performance to be obtained by the electronics during their high-heat-dissipation operating periods by storing excess thermal energy in the shape-memory material(s) of the structure and later releasing the stored thermal energy.

With these approaches, it is easier to satisfy any applicable SWaP requirements since multi-functionality is achieved by integrating thermal energy storage directly into a thermally-enhanced structure. That is, an integrated structure can be constructed from one or more appropriate shape-memory materials (or other materials exhibiting solid-solid phase transformations), and the shape-memory material(s) can be used to form one or more thermal energy transfer devices (such as one or more oscillating heat pipes) or can be paired with one or more thermally-conductive materials (such as graphite). This enables the simultaneous storage and highly-efficient transport of thermal energy and results in an overall cooling architecture with fewer components (lowering SWaP) and a more thermally-effective distributed heat storage capacity.

Additional details of example embodiments of these approaches are provided below. It should be noted that these details relate to specific implementations of devices and systems that utilize these approaches and that other implementations of devices and systems can vary as needed or desired. For example, while the description below may use specific examples of materials to form integrated structures, other suitable materials can be used. As another example, while the description below may describe specific uses of one or more integrated structures, the integrated structures can be used in any other suitable applications. It should also be noted here that while often described as integrating one or more shape-memory materials with one or more thermal energy transfer mechanisms, one or more non-shape-memory materials can also be used in an integrated structure along with the one or more shape-memory materials. Thus, for instance, at least one portion of a structure can be formed using one or more shape-memory materials, and at least one other portion of the structure can be formed using one or more non-shape-memory materials.

FIG. 1 illustrates a first example integrated thermal energy transport and storage structure 100 in accordance with this disclosure. The structure 100 is generally configured to receive and transport thermal energy and, if required, to temporarily store at least some of the thermal energy.

As shown in FIG. 1, the structure 100 includes a number of distinct inline and interconnected thermomechanical regions 102-106. Each of the thermomechanical regions 102-106 represents a portion of the structure 100 that is used to perform at least one specific function. For example, the structure 100 includes one or more heat input regions 102, which are configured to receive thermal energy to be transported by the structure 100. The structure 100 also includes one or more adiabatic regions 104, which are configured to provide structural support for the structure 100 while also being configured to transport thermal energy to or from other regions of the structure 100. The term "adiabatic" refers to the characteristic or capability of transferring thermal energy while substantially or completely preventing heat transfer to and from an external environment. In other words, the adiabatic region(s) 104 can transport thermal energy to or from other regions of the structure 100 without leaking the thermal energy into the external environment and without gaining thermal energy from the external environment (at least to a significant extent). In addition, the structure 100 includes one or more cold sink interface regions 106, which are configured to receive thermal energy from other regions of the structure 100 and to provide the thermal energy from the structure 100 to at least one heat sink (such as radiating fins, an airframe, or the ambient environment). In this example, the one or more adiabatic regions 104 are located between the one or more heat input regions 102 and the one or more cold sink interface regions 106.

It should be noted here that one or more of these thermomechanical regions 102-106 may be optional and can be omitted from the structure 100. For example, the one or more adiabatic regions 104 may be omitted if the other thermomechanical regions 102, 106 do not require structural support, reinforcement, or extended heat transport using any adiabatic regions. It should also be noted here that the order or positioning of the thermomechanical regions 102-106 can vary as needed or desired. For instance, one or more adiabatic regions 104 can be positioned at one or more ends of the structure 100. Also, multiple heat input regions 102, multiple adiabatic regions 104, and/or multiple cold sink interface regions 106 may be used in the structure 100 in any suitable arrangement.

Each of the thermomechanical regions 102-106 is formed using one or more shape-memory alloys or other shape-memory material(s) or any other suitable material(s) that can exhibit a solid-solid phase transformation at a desired temperature or in a desired temperature range. Example types of shape-memory materials that may be used here include a CuAlNi or NiTi alloy. Each of the thermomechanical regions 102-106 can also have any suitable size, shape, and dimensions. If the structure 100 is going to exhibit a macrostructure change in shape when heated above a transition temperature, one or more dimensions of the structure 100 (length, width, and/or thickness) can be tailored to accommodate size restrictions of a payload or system and an intended transformation objective. Generally, a thinner cross section enables a smaller bend radius in accordance with maximum material strain limits for out-of-plane bending, although other mechanisms for stress relief (such as an expansion joint) may be used. If the structure 100 is only going to exhibit microstructure changes when heated above the transition temperature, the structure 100 can be made much thicker, which provides a greater thermal energy storage capacity for the structure 100.

One or more additional materials may also be used with the structure 100 to facilitate specific functions. For example, in particular embodiments, the cold sink interface region(s) 106 of the structure 100 may be coated with a suitable material, such as silver fluorinated ethylene propylene (TEFLON), to increase the efficiency of the cold sink interface region(s) 106 in radiating thermal energy as emitted radiation. Also, in particular embodiments, the adiabatic region(s) 104 may be coated with a low-emissivity coating or insulator or a multi-layer insulation (MLI) to help reduce or prevent heat loss or heat gain through the adiabatic region(s) 104. For space applications, for instance, an insulator may be painted or otherwise deposited onto the adiabatic region(s) 104, or an MLI blanket can be constructed using multiple layers of aluminized polyimide film (such as KAPTON) with a polyethylene terephthalate mesh (such as DACRON) or other plastic separating each of the layers and attached to a substrate in any number of ways (such as by using rivets, buttons, dual locks, or tape). In addition, in particular embodiments, an insulation may be placed on one or more surfaces of the structure 100 that are not meant to transfer thermal energy, such as to prevent thermal energy from being rejected back towards a device or system being cooled.

In this example, at least one heat source 108 is mounted on the heat input region 102, which allows thermal energy from the heat source 108 to be provided directly to the structure 100. However, this direct mounting of at least one heat source 108 on the structure 100 is not required, and thermal energy from at least one heat source 108 can be provided to the structure 100 in any suitable manner. Each heat source 108 represents any suitable structure configured to generate thermal energy to be removed or rejected using the structure 100. For instance, a heat source 108 can represent electrical circuitry, one or more electronic devices, one or more power supplies, or other component(s) of a satellite, missile, rocket, or other flight vehicle that can generate heat during operation. A heat source 108 may also represent a thermal conductor or, in general, any other structure that achieves a higher temperature than the structure 100 during operation, either through its own thermal energy generation or by receiving thermal energy from one or more other components.

Figure 2A:
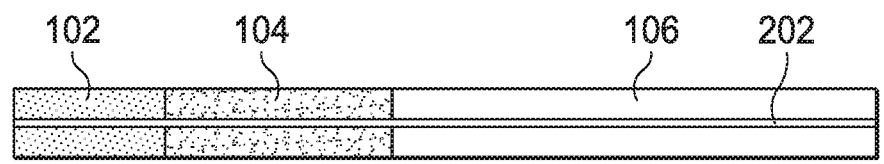
FIGS. 2A and 2B illustrate example cross-sections of the integrated thermal energy transport and storage structure of FIG. 1 in accordance with this disclosure.
Figure 2B:
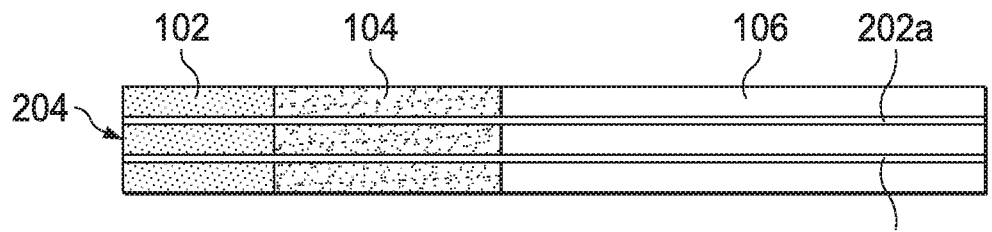

FIGS. 2A and 2B illustrate example cross-sections of the integrated thermal energy transport and storage structure 100 of FIG. 1 in accordance with this disclosure. As shown in FIG. 2A, the structure 100 includes a thermal energy transfer device 202 that is embedded in at least some of the thermomechanical regions 102-106. As shown in FIG. 2B, the structure 100 includes multiple thermal energy transfer devices 202a-202b that are embedded in at least some of the thermomechanical regions 102-106.

Each of these thermal energy transfer devices 202, 202a-202b is configured to transfer thermal energy between different ones of the thermomechanical regions 102-106. For example, each thermal energy transfer device 202, 202a-202b may receive thermal energy via the one or more heat input regions 102 and transfer the thermal energy to the one or more cold sink interface regions 106 through the one or more adiabatic regions 104. In this way, each thermal energy transfer device 202, 202a-202b helps to transport thermal energy away from the one or more heat sources 108 to the one or more cold sink interface regions 106, where the thermal energy can be removed from the structure 100. Each thermal energy transfer device 202, 202a-202b thereby helps to compensate for the lower thermal conductivity of the shape-memory material(s) used in the structure 100.

Each thermal energy transfer device 202, 202a-202b includes any suitable structure configured to transport thermal energy between different thermomechanical regions 102-106 of the structure 100. For example, in some embodiments, each thermal energy transfer device 202, 202a-202b includes one or more oscillating heat pipes. An oscillating heat pipe typically represents a serpentine or other tube or passageway that transports heat through phase changes and motion of liquid slugs and vapor bubbles. Oscillating heat pipe technology enables a wide variety of structural materials to have increased thermal conductivities without requiring integrated wicks, which are often found in conventional heat pipe technologies. However, any other or additional suitable thermal energy transfer device(s) 202, 202a-202b may be used in the structure 100. For instance, other phase-change heat transfer devices 202, 202a-202b (such as devices using liquid-to-vapor phase change materials) may be used, where a phase-change heat transfer device represents a device that transfers thermal energy through phase changes in one or more working fluids. Specific examples include other types of heat pipes and vapor chambers. As another example, the thermal energy transfer device(s) 202, 202a-202b may be implemented using one or more highly-thermally conductive materials, such as graphite. As yet another example, the thermal energy transfer device(s) 202, 202a-202b may be implemented using one or more fluid flows, each of which may represent a non-phase-change fluid that transfers thermal energy while flowing through a conduit.

Note that while FIGS. 2A and 2B show the thermal energy transfer devices 202, 202a-202b extending substantially or completely through all thermomechanical regions 102-106 of the structure 100, this need not be the case. For example, a single thermal energy transfer device 202, 202a-202b may extend completely through one or some thermomechanical regions 102-106 and partially through other thermomechanical regions 102-106. As another example, different thermal energy transfer devices 202, 202a-202b may be used, where each thermal energy transfer device 202, 202a-202b extends partially or completely through one or some (but not all) of the thermomechanical regions 102-106. In general, each of one or more thermal energy transfer devices 202, 202a-202b may support the transport of thermal energy partially or completely through one or more thermomechanical regions 102-106.

Also note that while two thermal energy transfer devices 202a-202b are shown in FIG. 2B, the structure 100 may include any suitable number of thermal energy transfer devices in any suitable configuration. For example, the structure 100 may include two or more thermal energy transfer devices in a single layer and/or two or more thermal energy transfer devices in different layers. Further note that the shape-memory material(s) forming the bulk of the structure 100 can envelop or encase the one or more thermal energy transfer devices 200, 202a-202b and may extend continuously along the length of the structure 100 around the thermal energy transfer devices 200, 202a-202b. In addition, note that material 204 adjacent (and possibly between) the thermal energy transfer devices 202, 202a-202b may represent one or more highly thermally conductive materials (such as copper, aluminum, or graphite) and that this material 204 may sandwich at least one of multiple thermal energy transfer devices 202a-202b.

Each of the thermomechanical regions 102-106 and the thermal energy transfer device(s) 202, 202a-202b of the structure 100 can be formed in any suitable manner. For example, one or more thermal energy transfer devices 202, 202a-202b can be formed as channels in a body of the structure 100, and a lid can be placed over and attached to the body in order to form a completed structure 100. This type of implementation is described below with reference to FIGS. 3A and 3B. However, the structure 100 can be formed in any other suitable manner, such as when formed as an integral structure (via injection molding, additive manufacturing, extrusion, or other suitable techniques) or when formed as separate components (via any suitable techniques) that are then connected together. Each of the thermomechanical regions 102-106 may be formed separately and connected together, or some/all of the thermomechanical regions 102-106 may be formed as an integral structure. If separate portions of the structure 100 are formed, those portions may be joined together in any suitable manner, such as via the use of butt joints or other joints that can be formed through laser welding, brazing, friction stir welding, ultrasonic welding, or other suitable techniques.

In one aspect of operation, thermal energy emanating from the heat source 108 can be transported by the structure 100 and rejected, such as into an external environment. The thermal energy transfer device(s) 202, 202a-202b help to enhance the ability of the structure 100 to receive the thermal energy, distribute the thermal energy throughout the structure 100, and transmit the thermal energy for eventual rejection. If the output power of the heat source 108 spikes (such as due to intermittent high-power operations of the heat source 108), the thermal energy generated by the heat source 108 may exceed the steady-state heat rejection capability of the structure 100. During this time, part of the thermal energy generated by the heat source 108 can continue to be rejected by the structure 100, while another part of the thermal energy generated by the heat source 108 can accumulate within the shape-memory material(s) forming at least part of the structure 100. Initially, the storage of thermal energy in the structure 100 can cause the temperature of the shape-memory material(s) to increase. If and when the temperature reaches the transition temperature of the shape-memory material(s), the temperature of the structure 100 can stabilize, since the thermal energy is absorbed during the solid-solid phase transformation without raising the temperature of the shape-memory material(s) (at least to a significant extent). This helps to ensure consistent and reliable operation of the device(s) represented by the heat source 108 during the phase transition period of time. Note that if the solid-solid phase transformation of the shape-memory material(s) completes before the transient operation of the heat source 108 ends, the temperature of the shape-memory material(s) may again increase.

In another aspect of operation, the structure 100 may be used in applications where the structure 100 prevents excessive heat in the ambient environment from reaching the heat source 108. For example, if the cold sink interface region 106 of the structure 100 is coupled to the exterior skin of a flight vehicle, the structure 100 would ordinarily be used to transport thermal energy away from the heat source 108 to the exterior skin of the flight vehicle for subsequent transmission into the ambient environment. However, during certain times (such as during high-speed flight of an airborne vehicle or during solar loading of a space vehicle), the exterior skin of the flight vehicle may become extremely hot, so thermal energy from the heat source 108 cannot be effectively rejected through the exterior skin of the flight vehicle, placing the heat source 108 at risk of failure. During these times, thermal energy generated by the heat source 108 and thermal energy from the exterior skin of the flight vehicle can accumulate within the shape-memory material(s) forming at least part of the structure 100. Initially, the storage of thermal energy in the structure 100 can cause the temperature of the shape-memory material(s) to increase. If and when the temperature reaches the transition temperature of the shape-memory material(s), the temperature of the structure 100 can stabilize as the thermal energy is absorbed during the solid-solid phase transformation of the shape-memory material(s). Again, this helps to ensure consistent and reliable operation of the device(s) represented by the heat source 108 during the phase transition period of time. Note, that if the solid-solid phase transformation of the shape-memory material(s) completes before the transient period of time ends, the temperature of the shape-memory material(s) may again increase.

While specific shape-memory materials (such as CuAlNi alloys and NiTi alloys) are described above, the structure 100 here can be formed using a broad class of shape-memory materials, as well as any other suitable materials that can experience solid-solid phase transformations. As a result, various formulations of materials are available that can provide phase transformation thresholds at different temperatures or temperature ranges. Thus, different formulations of materials can be used in different applications to support different operational temperature ranges, different latent heats of transformation, and different mechanical strengths for the structure 100. In addition, different shape-memory materials can have different heat capacities. The dimensions of the structure 100 (including its length, width, and/or thickness) can be tailored according to the desired thermal energy storage capacity of the structure 100, which is based on the heat capacity and latent heat of transformation of the specific material(s) used in the structure 100.

Although FIG. 1 illustrates one example of an integrated thermal energy transport and storage structure 100 and FIGS. 2A and 2B illustrate examples of cross-sections of the integrated thermal energy transport and storage structure 100, various changes may be made to FIGS. 1, 2A, and 2B. For example, the shape of the overall structure 100 shown in FIG. 1 is for illustration only and can vary as needed or desired, such as to conform to available space. Also, the relative sizes and shapes of the components of the structure 100 are for illustration only and can vary as needed or desired. As a particular example, the cross-sections of the structure 100 may or may not have a uniform thickness.

Figure 3A:
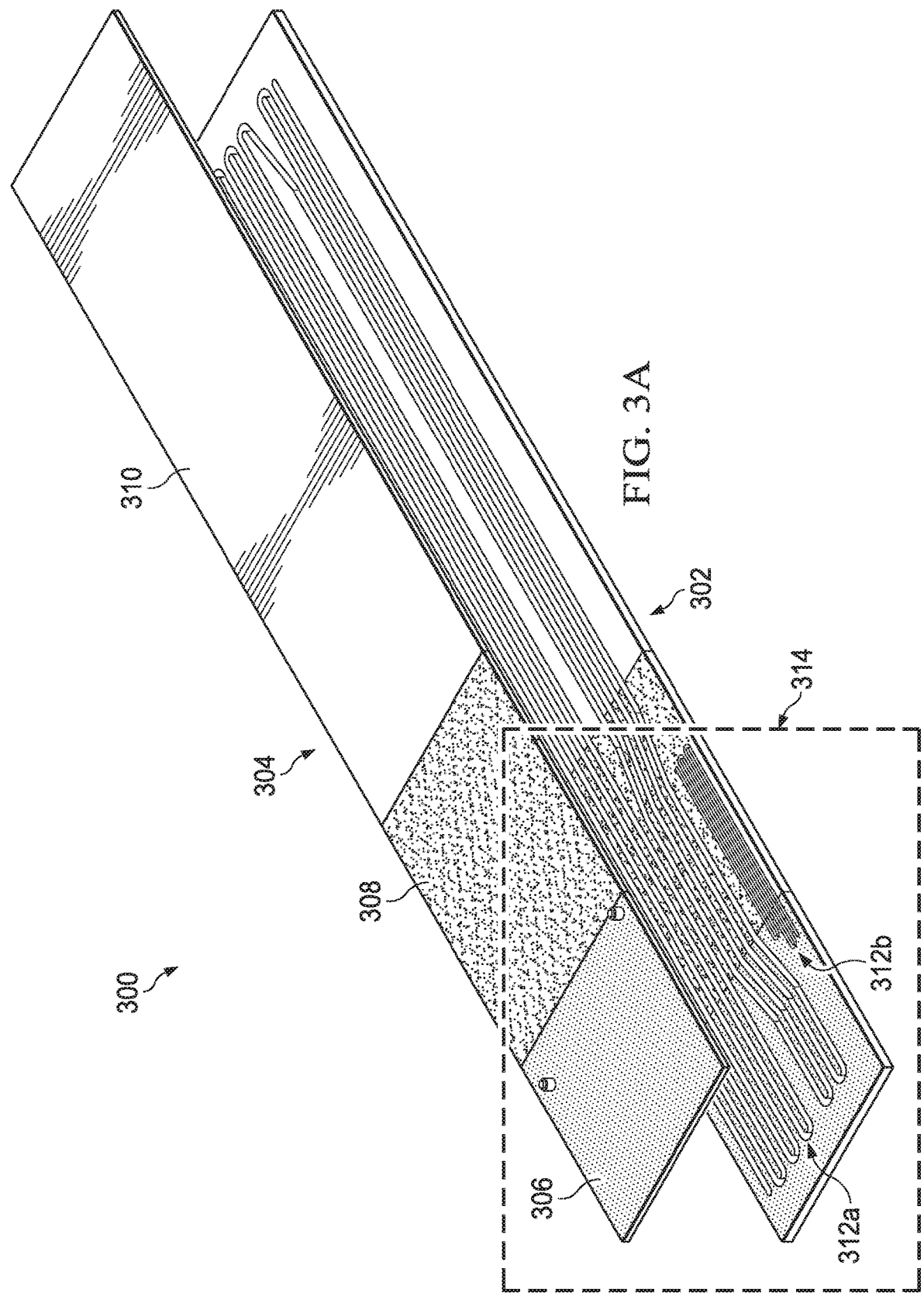
FIGS. 3A and 3B illustrate a second example integrated thermal energy transport and storage structure in accordance with this disclosure.
Figure 3B:
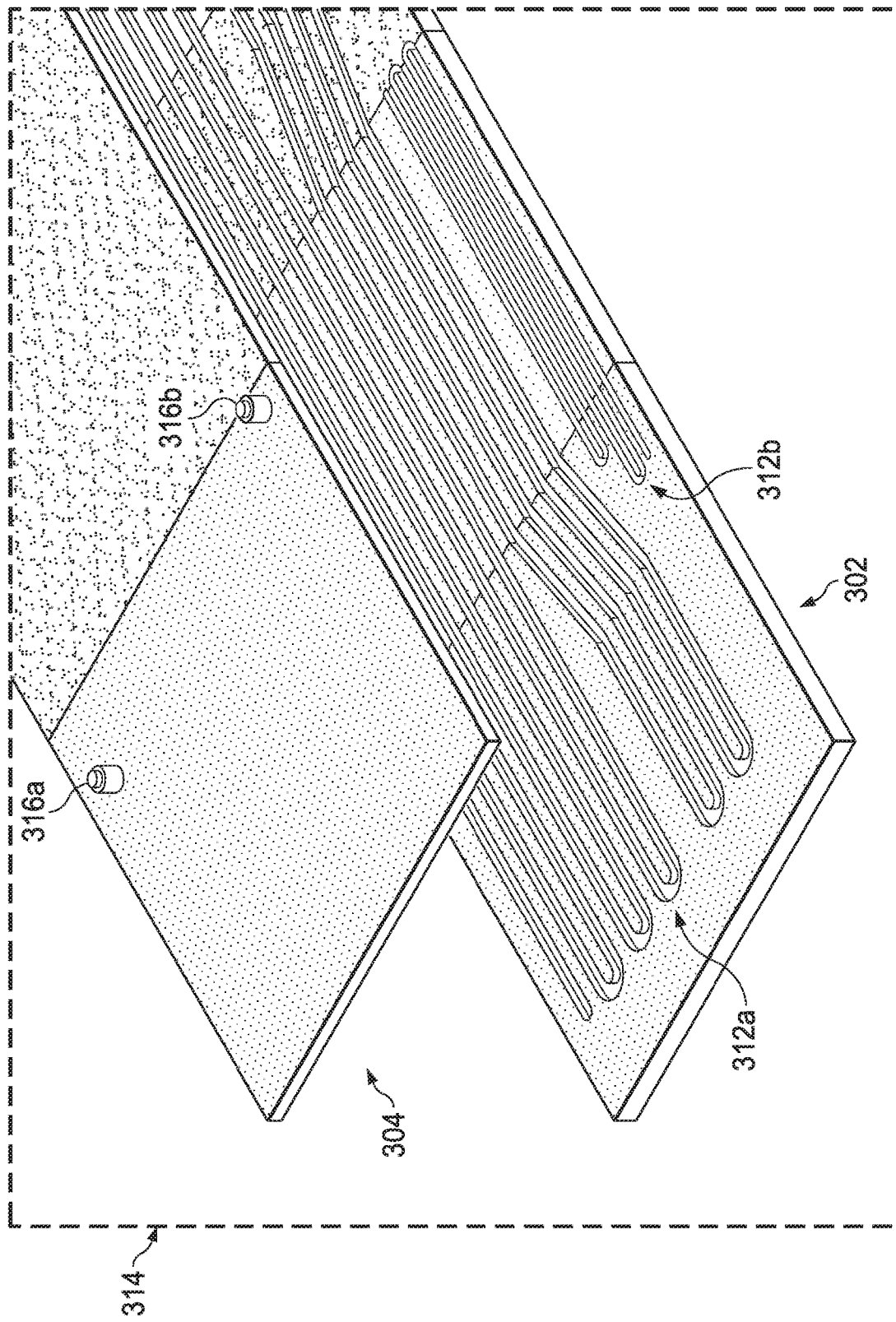

FIGS. 3A and 3B illustrate a second example integrated thermal energy transport and storage structure 300 in accordance with this disclosure. In particular, FIGS. 3A and 3B illustrate a particular implementation of the structure 100 shown in FIG. 1 described above. The structure 300 here is generally configured to receive and transport thermal energy and, if required, to temporarily store at least some of the thermal energy.

As shown in FIGS. 3A and 3B, the structure 300 includes a body 302 and a lid 304. The lid 304 can be secured to the body 302 in order to form a completed structure 300. Any suitable techniques can be used to secure the lid 304 to the body 302, such as laser welding, brazing, friction stir welding, ultrasonic welding, diffusion bonding, or other techniques. A seal is formed between the body 302 and the lid 304 in order to prevent a working fluid in the structure 300 from leaking during operation.

In this example, the body 302 and the lid 304 each includes a number of distinct inline and interconnected thermomechanical regions 306-310. Each of the thermomechanical regions 306-310 represents a portion of the structure 300 that is used to perform at least one specific function. For example, the structure 300 includes one or more heat input regions 306, which are configured to receive thermal energy to be transported by the structure 300. The structure 300 also includes one or more adiabatic regions 308, which are configured to provide structural support for the structure 300 while also being configured to transport thermal energy to or from other regions of the structure 300. In addition, the structure 300 includes one or more cold sink interface regions 310, which are configured to receive thermal energy from other regions of the structure 300 and to provide the thermal energy from the structure 300 to at least one heat sink (such as radiating fins, an airframe, or the ambient environment). In this example, the one or more adiabatic regions 308 are located between the one or more heat input regions 306 and the one or more cold sink interface regions 310.

Again, it should be noted here that one or more of these thermomechanical regions 306-310 may be optional and can be omitted from the structure 300. For example, the one or more adiabatic regions 308 may be omitted if the other thermomechanical regions 306, 310 do not require structural support, reinforcement, or extended heat transport using any adiabatic regions. It should also be noted here that the order or positioning of the thermomechanical regions 306-310 can vary as needed or desired. For instance, one or more adiabatic regions 308 can be positioned at one or more ends of the structure 300. Also, multiple heat input regions 306, multiple adiabatic regions 308, and/or multiple cold sink interface regions 310 may be used in the structure 300 in any suitable arrangement.

Each of the thermomechanical regions 306-310 is formed using one or more shape-memory alloys or other shape-memory material(s) or any other suitable material(s) that can exhibit a solid-solid phase transformation at a desired temperature or in a desired temperature range. Example types of shape-memory materials that may be used here include a CuAlNi or NiTi alloy. Each of the thermomechanical regions 306-310 can also have any suitable size, shape, and dimensions. If the structure 300 is going to exhibit a macrostructure change in shape when heated above a transition temperature, one or more dimensions of the structure 300 (length, width, and/or thickness) can be tailored to accommodate size restrictions of a payload or system and an intended transformation objective. One such case is where a thinner cross section enables a smaller bend radius in accordance with maximum material strain limits for out-of-plane bending or other mechanisms for stress relief. If the structure 300 is only going to exhibit microstructure changes when heated above the transition temperature, the structure 300 can be made much thicker, which provides a greater thermal energy storage capacity for the structure 300.

One or more additional materials may also be used with the structure 300 to facilitate specific functions, example, in particular embodiments, the cold sink interface region(s) 310 of the structure 300 may be coated with a suitable material, such as silver fluorinated ethylene propylene (TEFLON), to increase the efficiency of the cold sink interface region(s) 310 in radiating thermal energy as emitted radiation. Also, in particular embodiments, the adiabatic region(s) 308 may be coated with a low-emissivity coating or insulator or a multi-layer insulation (MLI) to help reduce or prevent heat loss or heat gain through the adiabatic region(s) 308. For space applications, for instance, an insulator may be painted or otherwise deposited onto the adiabatic region(s) 308, or an MLI blanket can be constructed using multiple layers of aluminized polyimide film (such as KAPTON) with a polyethylene terephthalate mesh (such as DACRON) or other plastic separating each of the layers and attached to a substrate in any number of ways (such as by using rivets, buttons, dual locks, or tape). In addition, in particular embodiments, an insulation may be placed on one or more surfaces of the structure 300 that are not meant to transfer thermal energy.

Each of the body 302 and the lid 304 can have any suitable size, shape, and dimensions. For example, the lid 304 may have the same shape as the body 302 and have an equal or smaller thickness compared to a thickness of the body 302 (although this need not be the case).

As shown here, the structure 300 also includes one or more thermal energy transfer devices. In this example, an oscillating heat pipe core is used to implement the thermal energy transfer device(s), where the core includes one or more oscillating heat pipe circuits 312a-312b. Each oscillating heat pipe circuit 312a-312b represents a passageway through which liquid and vapor can move. In some embodiments, a working fluid in the passageway can exist in liquid form until adequately heated, such as by thermal energy received through one or more heat input regions 306. Fluid in vapor form in the passageway can later re-enter the liquid form when the vapor is cooled, such as when thermal energy is removed from the vapor by one or more cold sink interface regions 310. Thus, thermal energy can be transported through the structure 300 using phase changes and motion of liquid slugs and vapor bubbles in each oscillating heat pipe circuit 312a-312b.

In this particular example, there are two oscillating heat pipe circuits 312a-312b. A portion 314 of the structure 300 in FIG. 3A is shown in an enlarged view in FIG. 3B. As can be seen here, the oscillating heat pipe circuit 312a generally includes one or more larger fluid passageways formed using wider turns, while the oscillating heat pipe circuit 312b generally includes one or more smaller fluid passageways formed using smaller turns. Also, the oscillating heat pipe circuit 312a here extends across substantially all of the thermomechanical regions 306-310 of the body 302, while the oscillating heat pipe circuit 312b here extends across the thermomechanical region 308 and partially into the thermomechanical regions 306 and 308. In particular embodiments, the oscillating heat pipe circuits 312a-312b may be used to accept thermal energy from components having different heating parameters or geometries. Note, however, that these two implementations of the oscillating heat pipe circuits 312a-312b are for illustration only and that any number and arrangement of oscillating heat pipe circuits may be used.

Each oscillating heat pipe circuit 312a-312b has an associated charging port 316a-316b, which allows fluid to be injected into that oscillating heat pipe circuit 312a-312b after the lid 304 has been secured to the body 302. In some embodiments, each charging port 316a-316b is welded or otherwise secured to the structure 300 and is designed to be closed or otherwise sealed after fluid is injected into the associated oscillating heat pipe circuit 312a-312b. Alternatively, if it is possible to include fluid in the oscillating heat pipe circuits 312a-312b during fabrication of the structure 300, the charging ports 316a-316b may potentially be omitted here.

Each of the body 302, the lid 304, and the thermomechanical regions 306-310 can be formed in any suitable manner. For example, each of the thermomechanical regions 306-310 of the body 302 and/or lid 304 may be formed separately and connected together, or some/all of the thermomechanical regions 306-310 of the body 302 and/or lid 304 may be formed as an integral structure. If separate portions of the body 302 and/or lid 304 are formed, those portions may be joined together in any suitable manner, such as via the use of butt joints or other joints that can be formed through laser welding, brazing, friction stir welding, ultrasonic welding, or other suitable techniques. One or more oscillating heat pipe circuits 312a-312b can also be formed in any suitable manner, such as by using photochemical machining, computer numerical control (CNC) milling, additive manufacturing, or other suitable techniques.

Although FIGS. 3A and 3B illustrate a second example of an integrated thermal energy transport and storage structure 300, various changes may be made to FIGS. 3A and 3B. For example, the shape of the overall structure 300 shown in FIGS. 3A and 3B is for illustration only and can vary as needed or desired, such as to conform to available space. Also, the relative sizes and shapes of the components of the structure 300 are for illustration only and can vary as needed or desired. As a particular example, the structure 300 may or may not have a uniform thickness. Further, while the oscillating heat pipe circuits 312a-312b are shown here as being formed completely within the body 302, part or all of one or more oscillating heat pipe circuits 312a-312b may be formed in the lid 304. For instance, one or more oscillating heat pipe circuits 312a-312b may be formed in the body 302 and the lid 304 symmetrically across a bond line interface between the body 302 and the lid 304, where the bond line interface is aligned with a neutral axis of the structure 300. Moreover, there may be one or multiple layers each having one or more oscillating heat pipe circuits. In addition, as noted above with respect to FIG. 1, any other suitable thermal energy transfer device(s) may be used in an integrated structure, and these structures are not limited to use with one or more oscillating heat pipe circuits.

Figure 4:
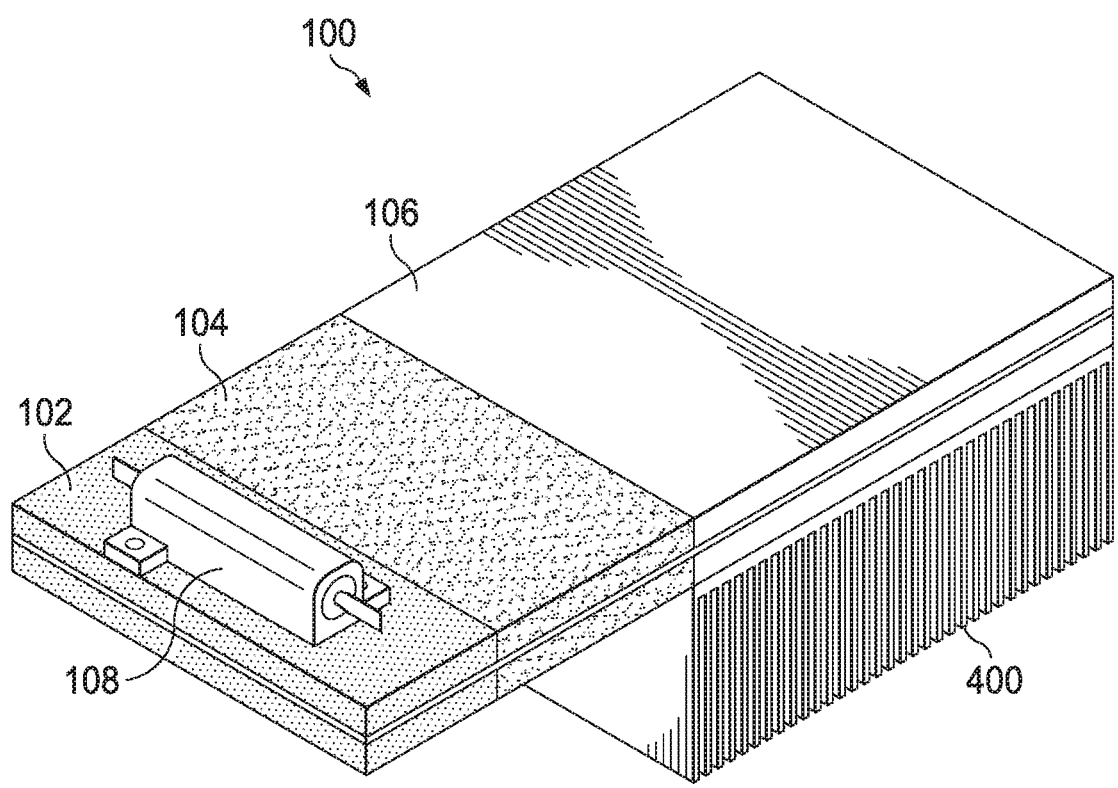
FIGS. 4 through 6 illustrate example uses of an integrated thermal energy transport and storage structure in accordance with this disclosure.
Figure 5:
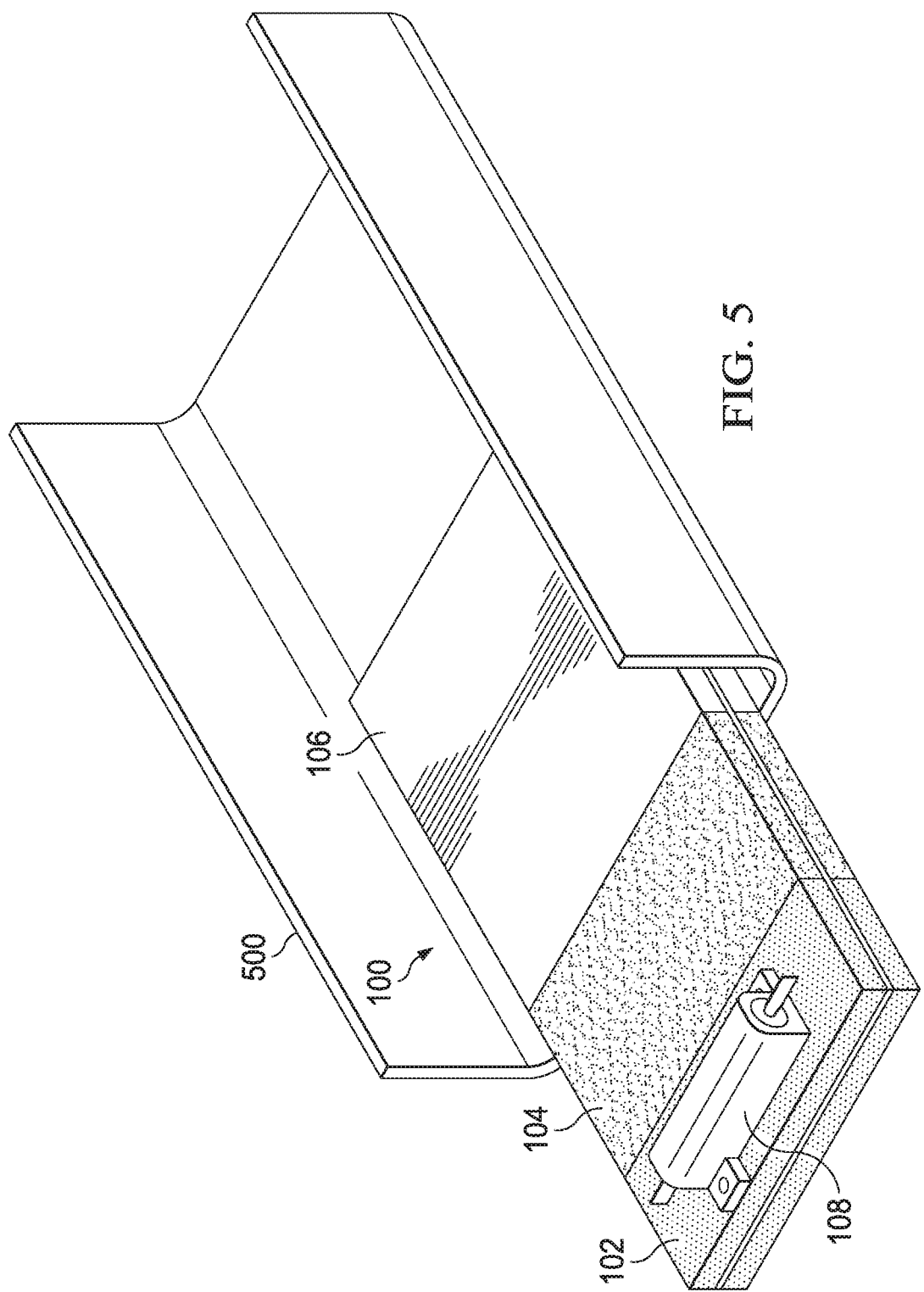
Figure 6:
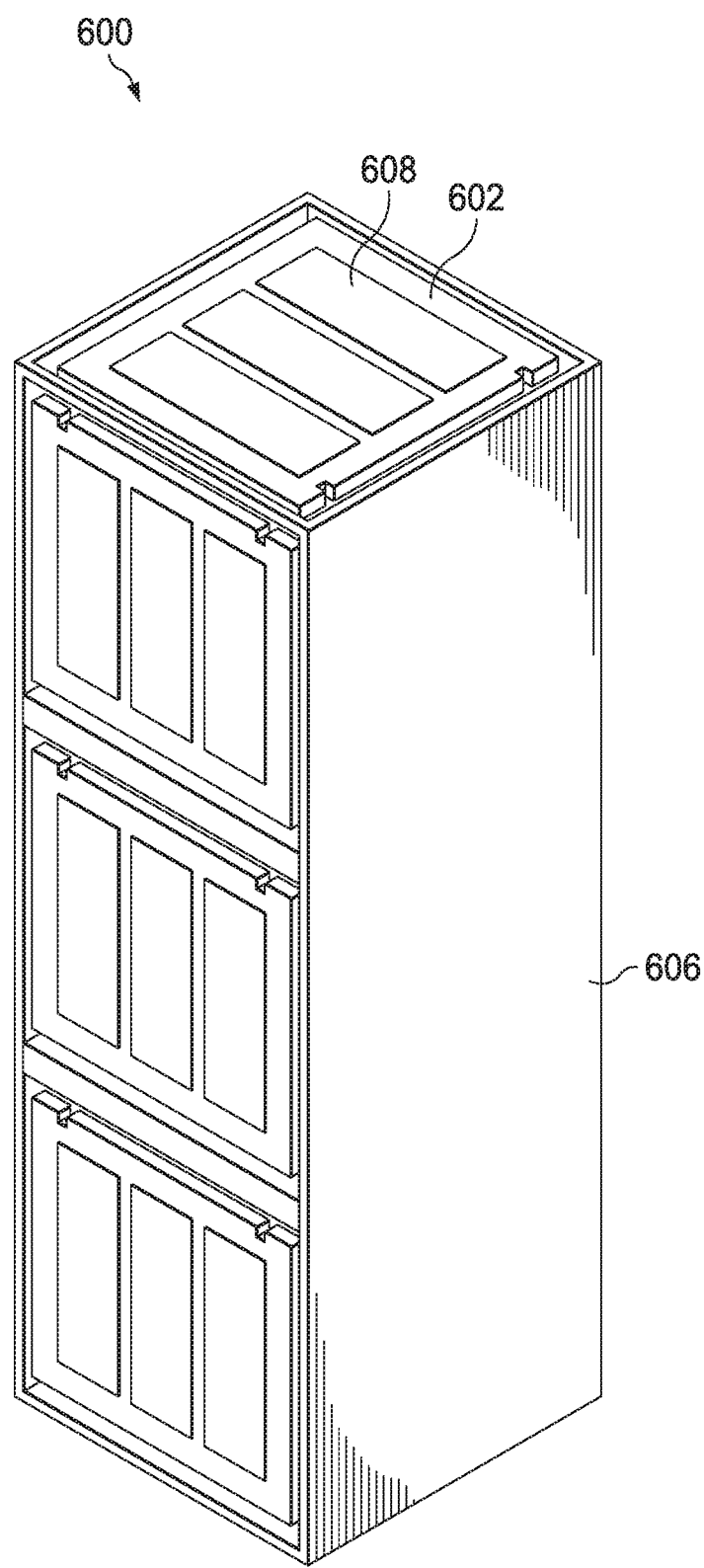

FIGS. 4 through 6 illustrate example uses of an integrated thermal energy transport and storage structure in accordance with this disclosure. In particular, FIGS. 4 through 6 illustrate example ways in which the integrated thermal energy transport and storage structure 100 described above may be used. Note, however, that the integrated thermal energy transport and storage structure 100 may be used in any other suitable manner. Also note that the integrated thermal energy transport and storage structure 300 described above may be used in the same or similar manner as shown in FIGS. 4 through 6 or in any other suitable manner.

As shown in FIG. 4, the integrated thermal energy transport and storage structure 100 can be coupled to a heat sink 400, which is configured to convect and/or radiate thermal energy into an ambient environment or otherwise remove thermal energy from the structure 100. Thermal energy from the heat source 108 is transported through the integrated thermal energy transport and storage structure 100 from the heat input region 102 to the cold sink interface region 106. This thermal energy transport is facilitated by the one or more thermal energy transfer devices 202, 202a-202b embedded in the structure 100. The cold sink interface region 106 can be thermally coupled to the heat sink 400, such as via a thermal interface material or other suitable interface. This allows the heat sink 400 to remove thermal energy from the structure 100, thereby helping to cool the heat source 108.

If the output power of the heat source 108 spikes (such as during intermittent high-power operations of the heat source 108), some of the thermal energy continues to be rejected by the structure 100, while excess thermal energy generated by the heat source 108 may be temporarily stored in the shape-memory material(s) of the structure 100. If the heat sink 400 becomes unable to reject thermal energy safely without causing the heat source 108 to exceed its temperature limit (such as when experiencing an increase in temperature from aerodynamic drag or solar loading), thermal energy generated by the heat source 108 or generated by the aerodynamic drag or solar loading may be temporarily stored in the shape-memory material(s) of the structure 100. Once the transient event ends, the stored energy in the shape-memory material(s) of the structure 100 can be provided to the heat sink 400, such as via the thermal energy transfer device(s) 202, 202a-202b, for rejection.

The heat sink 400 includes any suitable structure configured to receive thermal energy from a structure and to convect, radiate, or otherwise discard of the thermal energy. In this example, the heat sink 400 includes a number of large planar fins extending away from a base, where the base is coupled (at least thermally) to the cold sink interface region 106 of the structure 100. Of course, various other designs for heat sinks may be used here.

As shown in FIG. 5, the integrated thermal energy transport and storage structure 100 can be coupled to an exterior skin/surface, interior frame, or other portion 500 of a flight vehicle (such as a satellite, rocket, or missile). The portion 500 of the flight vehicle may be formed using one or more non-phase change materials, such as steel; titanium; aluminum; carbon fibers, reinforced carbon fibers, or other high-strength, relatively low-density material(s); or any other suitable material(s). The portion 500 of the flight vehicle can be bonded or otherwise secured to the integrated thermal energy transport and storage structure 100 in any suitable manner.

As noted above, there may be times when a flight vehicle or other system experiences elevated temperatures, such as during high-speed flight or solar loading. Various prior approaches have been developed in an attempt to prevent excessive temperatures during flight from causing electronic devices to overheat, such as the formation of on-demand air gaps or the use of tortuous thermal transfer paths. Other prior approaches are often referred to as "thermal diode" solutions and typically provide a mechanism that creates a directional thermal conductivity, which supports a high value of thermal conductivity from an interior surface to an exterior surface and a low value of thermal conductivity from the exterior surface to the interior surface. These approaches then operate to decrease or negate heat transfer from an external environment under intense heating scenarios. For example, thermal resistance along a thermal transfer path can be controlled using heat pipes with variable thermal conductances or heat pipes exploiting post-limit operation (such as critical temperature switches). As another example, remotely-placed, non-integral thermal energy storage can be provided, such as those having solid-to-liquid, solid-to-vapor, or liquid-to-vapor phase change materials. However, these approaches can suffer from the same limitations discussed above, such as increasing the size and weight of an overall system and increasing thermal resistance. Also, thermal diode techniques often protect electrical components at the expense of poor steady-state thermal performance and reliability.

During normal operation in FIG. 5, the integrated thermal energy transport and storage structure 100 helps to transport thermal energy from the heat input region 102 to the cold sink interface region 106, thereby enabling the effective transfer of thermal energy from the heat source 108 to the portion 500 of the flight vehicle. The cold sink interface region 106 can be thermally coupled to the portion 500 of the flight vehicle, such as via a thermal interface material or other suitable interface. This allows the portion 500 of the flight vehicle to remove thermal energy from the structure 100, thereby helping to cool the heat source 108. If the output power of the heat source 108 spikes (such as during intermittent high-power operations of the heat source 108), some of the thermal energy continues to be rejected by the structure 100, while excess thermal energy generated by the heat source 108 may be temporarily stored in the shape-memory material(s) of the structure 100. If the temperature of the portion 500 of the flight vehicle spikes (such as due to aerodynamic drag or solar loading), thermal energy from the heat source 108 and from the portion 500 of the flight vehicle may be temporarily stored in the shape-memory material(s) of the structure 100 to protect the heat source 108. If and when conditions subsequently improve, the structure 100 can resume rejecting thermal energy from the heat source 108, as well as rejecting thermal energy stored in the shape-memory material(s) of the structure 100.

The structure 100 in FIG. 5 has the ability to act essentially as a temporary "heat shield," which can help to protect one or more components from thermal overload caused by excessive heating of a flight vehicle or other system. This can help to stabilize the performance and extend the operating life of the one or more components. During extreme heating of the portion 500 of the flight vehicle, the thermal energy transfer device(s) 202, 202a-202b can provide an increase in thermal resistance between the excess heat and the one or more components being protected. This effect can be very useful for structures employing heat pipe (oscillating, traditional, or otherwise) type thermal transfer devices, since solid materials such as tungsten and thermal pyrolytic graphite exhibit large differences in thermal conductivity but their applicability within this context is limited due to the cold temperatures required. This further enhances the efficacy of this approach.

As shown in FIG. 6, one or more instances of a modified version of the integrated thermal energy transport and storage structure 100 may be used with a satellite 600. In this particular example, the satellite 600 represents a three-unit cube satellite, although any other suitable satellite or other space vehicle may be used here. The satellite 600 includes various heat sources 608, such as one or more electrical components, power supplies, or other components. The heat sources 608 are mounted on one or more heat input regions 602, which are thermally coupled to one or more cold sink interface regions 606 (optionally through one or more adiabatic regions).

During normal operation, thermal energy from the heat sources 608 can be removed through the heat input regions 602 and rejected into the ambient environment through the cold sink interface regions 606. During a temperature excursion associated with a transient event (such as solar loading), one or more shape-memory materials forming the heat input regions 602 and the cold sink interface regions 606 (and optionally the adiabatic regions) can absorb thermal energy from the heat sources 608 and thermal energy from the external loading, helping to protect the heat sources 608. In some embodiments, these thermal protection structures can form a strongback for the satellite 600.

Note that, depending on the implementation, one, some, or all sides of the satellite 600 may include cold sink interface regions 606. Each cold sink interface region 606 here can effectively function like a static wall radiator for the satellite 600, meaning the cold sink interface region 606 forms a wall of the satellite 600 and radiates thermal energy received from other components of the satellite 600. Essentially, this moves thermal energy storage to the outer extremities of the satellite 600, which helps to reduce the size and weight of the satellite 600 while providing an improved or maximum amount of radiative surface area for the satellite 600.

Although FIGS. 4 through 6 illustrate example uses of an integrated thermal energy transport and storage structure, various changes may be made to FIGS. 4 through 6. For example, while FIGS. 4 through 6 illustrate various ways in which the structures 100, 300 described above can be used or implemented, the structures 100, 300 can be used in any other suitable manner. Also, the specific heat sink 400, portion 500 of a flight vehicle, and satellite 600 shown in FIGS. 4 through 6 are examples only.

Figure 7A:
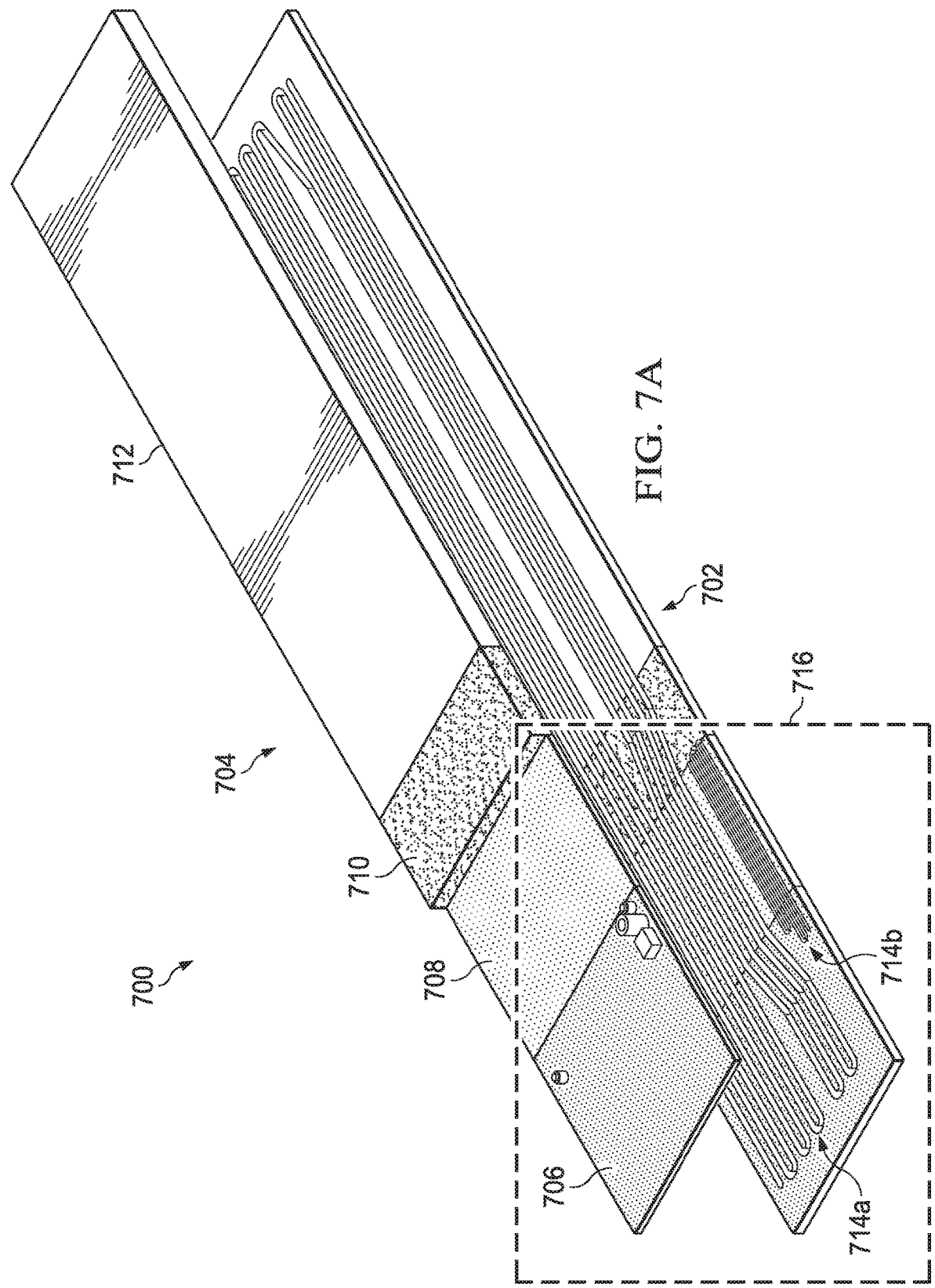
FIGS. 7A and 7B illustrate a third example integrated thermal energy transport and storage structure in accordance with this disclosure.
Figure 7B:
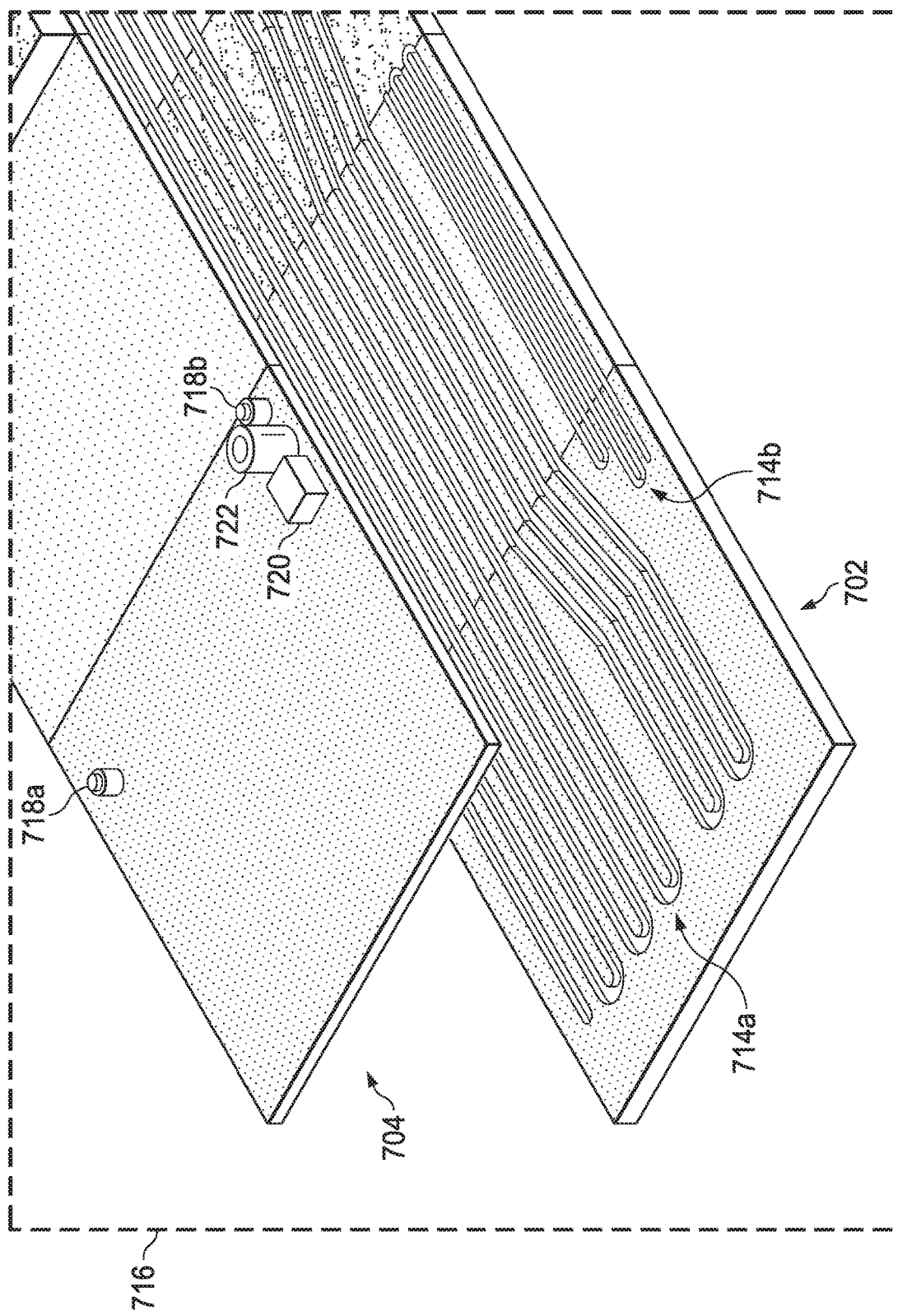

FIGS. 7A and 7B illustrate a third example integrated thermal energy transport and storage structure 700 in accordance with this disclosure. In particular, FIGS. 7A and 7B illustrate a particular implementation of the structure 100 shown in FIG. 1 described above. The structure 700 here is generally configured to receive and transport thermal energy and, if required, to temporarily store at least some of the thermal energy.

As shown in FIGS. 7A and 7B, the structure 700 is similar in form to the structure 300 described above. Here, the structure 700 includes a body 702 and a lid 704. The body 702 and the lid 704 each includes a number of distinct inline and interconnected thermomechanical regions 706-712. The thermomechanical regions include one or more heat input regions 706, one or more adiabatic regions 710, and one or more cold sink interface regions 712. The structure 700 also includes one or more thermal energy transfer devices. In this example, an oscillating heat pipe core is used to implement the thermal energy transfer device(s), where the core includes one or more oscillating heat pipe circuits 714a-714b. A portion 716 of the structure 700 in FIG. 7A is shown in an enlarged view in FIG. 7B. Each oscillating heat pipe circuit 714a-714b has an associated charging port 718a-718b, which allows fluid to be injected into that oscillating heat pipe circuit 714a-714b after the lid 704 has been secured to the body 702. These components may be the same as or similar to the corresponding components in FIGS. 3A and 3B.

In this example, the interconnected thermomechanical regions of the body 702 and/or lid 704 further include one or more morphable regions 708, which are configured to change shape in order to change an overall shape of the structure 700 while also being configured to transport thermal energy to or from other regions of the structure 700. In this particular example, the one or more morphable regions 708 are located between the one or more heat input regions 706 and the one or more cold sink interface regions 712. Also, in this particular example, the one or more adiabatic regions 710 are located between the one or more heat input regions 706 and the one or more cold sink interface regions 712.

Again, it should be noted here that one or more of these thermomechanical regions 706-712 may be optional and can be omitted from the structure 700. For example, the one or more adiabatic regions 710 may be omitted if the other thermomechanical regions 706, 708, 712 do not require structural support, reinforcement, or extended heat transport using any adiabatic regions. It should also be noted here that the order or positioning of the thermomechanical regions 706-712 can vary as needed or desired. For instance, one or more adiabatic regions 710 can be positioned at one or more ends of the structure 700, an adiabatic region 710 can be positioned between a heat input region 706 and a morphable region 708, or the morphable region 708 can be positioned elsewhere in the structure 700. Also, multiple heat input regions 706, multiple morphable regions 708, multiple adiabatic regions 710, and/or multiple cold sink interface regions 712 may be used in the structure 700 in any suitable arrangement.

Figure 8:
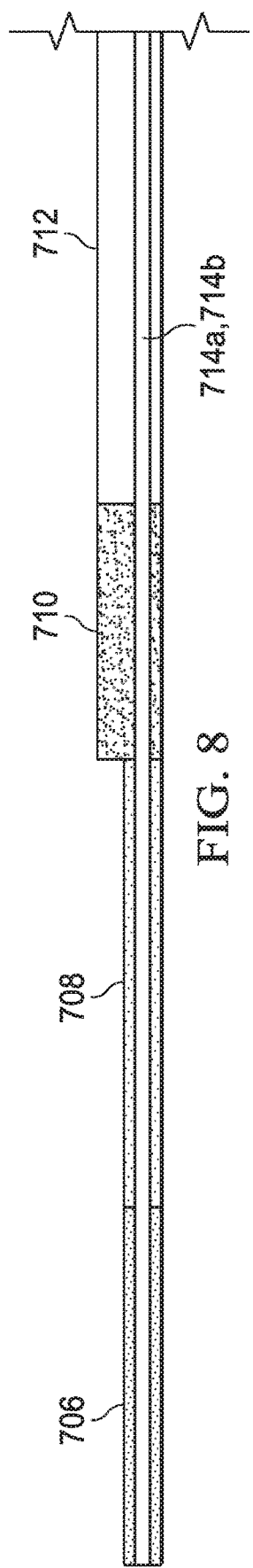
FIG. 8 illustrates an example cross-section of the integrated thermal energy transport and storage structure of FIGS. 7A and 7B in accordance with this disclosure.

FIG. 8 illustrates an example cross-section of the integrated thermal energy transport and storage structure 700 of FIGS. 7A and 7B in accordance with this disclosure. Note that the cross-section in FIG. 8 has a non-uniform thickness, which increases the thermal energy storage capability of some of the regions 710-712 here. However, the structure 700 may have a uniform thickness or any other suitable non-uniform thickness.

Each of the thermomechanical regions 706-712 is formed using one or more shape-memory alloys or other shape-memory material(s) or any other suitable material(s) that can exhibit a solid-solid phase transformation at a desired temperature or in a desired temperature range. Example types of shape-memory materials that may be used here include a CuAlNi or NiTi alloy. Note that in this example, the thickness of the morphable region 708 is reduced compared to the thickness of other regions 710 and 712, which provides for a smaller bend radius when the structure 700 is bent out-of-plane at the morphable region 708. At least one of the other regions 710, 712 (and possibly the region 706) can remain suitably thick to provide for adequate thermal energy storage if and when needed. However, this need not be the case, and all regions 706-712 may have substantially the same thickness. Also, different shape-memory materials can have different heat capacities. The dimensions of the structure 700 (including its length, width, and/or thickness) can be tailored according to the desired thermal energy storage capacity of the structure 700, which is based on the heat capacity and latent heat of transformation of the specific material(s) used in the structure 700. In addition, different shape-memory materials can have different strain accommodations, so different shape-memory materials can be used in the structure 700. As a particular example, the morphable region 708 (and possibly the heat input region 706) can be formed from one or more shape-memory materials having a higher strain accommodation (and optionally a lower heat capacity), while other regions 710 and 712 (and possibly the region 706) can be formed from one or more shape-memory materials having a lower strain accommodation (and optionally a higher heat capacity). A higher strain accommodation is generally indicative of the ability of a shape-memory material to accommodate and recover from a larger amount of strain, meaning more strain can be applied to the shape-memory material and the shape-memory material can still substantially recover its programmed shape.

One or more additional materials may also be used with the structure 700 to facilitate specific functions. For example, in particular embodiments, the cold sink interface region(s) 712 of the structure 700 may be coated with a suitable material, such as silver fluorinated ethylene propylene (TEFLON), to increase the efficiency of the cold sink interface region(s) 712 in radiating thermal energy as emitted radiation. Also, in particular embodiments, the adiabatic region(s) 710 may be coated with a low-emissivity coating or insulator or a multi-layer insulation (MLI) to help reduce or prevent heat loss or heat gain through the adiabatic region(s) 710. For space applications, for instance, an insulator may be painted or otherwise deposited onto the adiabatic region(s) 710, or an MLI blanket can be constructed using multiple layers of aluminized polyimide film (such as KAPTON) with a polyethylene terephthalate mesh (such as DACRON) or other plastic separating each of the layers and attached to a substrate in any number of ways (such as by using rivets, buttons, dual locks, or tape). In addition, in particular embodiments, an insulation may be placed on one or more surfaces of the structure 700 that are not meant to transfer thermal energy.

Each of the body 702 and the lid 704 can have any suitable size, shape, and dimensions. For example, the lid 704 may have the same shape as the body 702 and have an equal or smaller thickness compared to a thickness of the body 702 (although this need not be the case). Also, the structure 700 may have any suitable shapes, such as the shapes shown in FIGS. 9A and 9B described below.

In the specific arrangement shown in FIGS. 7A and 7B, the oscillating heat pipe circuit 714a can be used to transport thermal energy to be rejected through the structure 700 from one or more heat input regions 706 to one or more cold sink interface regions 712. The oscillating heat pipe circuit 714b can be used to transport thermal energy from a heater 720 or a feed port 722 at least partially through the morphable region(s) 708. The heater 720 represents a resistive heater or other circuit or device whose function results in the generation of thermal energy. The feed port 722 represents a fiber optic port or other port configured to receive thermal energy from an external source. In either case, the thermal energy from the heater 720 or feed port 722 is provided into one or more morphable regions 708, allowing the morphable region(s) 708 to change shape. This supports active deployment or other active shape-change of the structure 700. If the morphable regions 708 are to be triggered using incident or reflected radiation, focused radiation can be provided to the feed port 722. The radiation received at the feed port 722 can be provided by any suitable source(s), such as one or more lasers, light emitting diodes (LEDs), or solar collectors. While the heater 720 and feed port 722 are shown here as residing on a heat input region 706 of the lid 704, each of the heater 720 and the feed port 722 may be located at any other suitable position on the lid 704 or the body 702. Also, the structure 700 does not need to include both the heater 720 and the feed port 722.

Note that the use of active heating of the morphable region(s) 708 is not required and that the morphable region(s) 708 can change shape in any other suitable manner. For instance, the morphable region(s) 708 may be able to change shape upon reaching its transition temperature as a result of thermal energy being transported through the oscillating heat pipe circuit 714a. Thus, the heater 720 and the feed port 722 (along with the oscillating heat pipe circuit 714b) may be omitted here. Also, even when a heater 720 and/or a feed port 722 is used, the oscillating heat pipe circuit 714a may be used to transport thermal energy, so the oscillating heat pipe circuit 714b may be omitted. In general, one or more morphable regions 708 of the structure 700 may change shape based on any suitable passive or active heating of the morphable region(s) 708. Moreover, the structure 700 may include any suitable number and arrangement of oscillating heat pipe circuit(s), and the oscillating heat pipe circuit(s) may be used to transport thermal energy in any suitable manner between any desired locations of the structure 700. Thus, the structure 700 can include one or more oscillating heat pipe circuits of any suitable sizes, densities, and heat transfer capabilities.

Each of the body 702, the lid 704, and the thermomechanical regions 706-712 can be formed in any suitable manner. For example, each of the thermomechanical regions 706-712 of the body 702 and/or lid 704 may be formed separately and connected together, or some/all of the thermomechanical regions 706-712 of the body 702 and/or lid 704 may be formed as an integral structure. If separate portions of the body 702 and/or lid 704 are formed, those portions may be joined together in any suitable manner, such as via the use of butt joints or other joints that can be formed through laser welding, brazing, friction stir welding, ultrasonic welding, or other suitable techniques. One or more oscillating heat pipe circuits 714a-714b can also be formed in any suitable manner, such as by using photochemical machining, CNC milling, additive manufacturing, or other suitable techniques.

The structure 700 may be placed into a first state (shape) prior to deployment and then obtain a second state (shape) after deployment. The first state of the structure 700 can be obtained when the shape-memory material(s) forming at least the morphable regions 708 is in an unstrained "martensite phase" and is subsequently deformed to a reversible "strained" condition while remaining in the "martensite phase." The deformation can be accomplished in any suitable manner, such as by induced out-of-plane mechanical bending deformation up to a maximum material-specific reversible strain. The "martensite phase" can be induced by exposing the shape-memory material(s) of at least the morphable regions 708 to a temperature regime below a material-specific "austenite start" transformation temperature. This state can be induced to the body 702 and lid 704 separately or to the structure 700 after full integration of the lid 704 and the body 702.

In the second state of the structure 700, the shape-memory material(s) forming at least the morphable regions 708 can return to the "unstrained" condition, which is achieved by transforming the shape-memory material(s) from the "martensite phase" completely to the "austenite phase." This can be accomplished by subjecting the shape-memory material(s) of at least the morphable regions 708 to temperatures above the material-specific "austenite finish" transformation temperature, recovering the induced strain described in the first state. In the second state, the shape of the structure 700 can be specified by the design intent and can be set by standard shape-memory material processing techniques.

The structure 700 here can also provide the same types of thermal energy transport and storage operations described above. For example, during normal operation, at least one heat source can provide thermal energy to the structure 700, which transports the thermal energy from the one or more heat input regions 706 to the one or more cold sink interface regions 712 through the other regions 708, 710. This thermal energy can be removed through the one or more cold sink interface regions 712, such as via radiation or convection. During a temperature excursion associated with a transient event (such as the output power of the heat source(s) spiking, aerodynamic drag, or solar loading), some thermal energy continues to be rejected by the structure 700, while excess thermal energy may be temporarily stored in the shape-memory material(s) of the structure 700. Once the transient event ends, the thermal energy from the heat source(s) and the stored thermal energy can continue to be rejected.

Although FIGS. 7A and 7B illustrate a third example of an integrated thermal energy transport and storage structure 700 and FIG. 8 illustrates an example of a cross-section of the integrated thermal energy transport and storage structure 700, various changes may be made to FIGS. 7A, 7B, and 8. For example, the shape of the overall structure 700 shown in FIGS. 7A and 7B is for illustration only and can vary as needed or desired, such as to conform to available space. Also, the relative sizes and shapes of the components of the structure 700 are for illustration only and can vary as needed or desired. Further, while the oscillating heat pipe circuits 714a-714b are shown here as being formed completely within the body 702, part or all of one or more oscillating heat pipe circuits 714a-714b may be formed in the lid 704. For instance, one or more oscillating heat pipe circuits 714a-714b may be formed in the body 702 and the lid 704 symmetrically across a bond line interface between the body 702 and the lid 704, where the bond line interface is aligned with a neutral axis of the structure 700. Moreover, there may be one or multiple layers each having one or more oscillating heat pipe circuits. In addition, as noted above with respect to FIG. 1, any other suitable thermal energy transfer device(s) may be used in an integrated structure, and these structures are not limited to use with one or more oscillating heat pipe circuits.

Figure 9A:
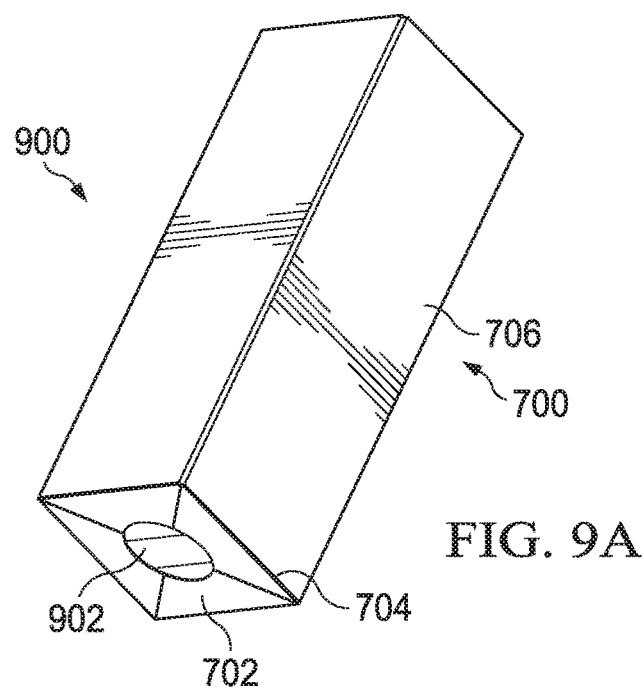
FIGS. 9A and 9B illustrate an additional example use of an integrated thermal energy transport and storage structure in accordance with this disclosure.
Figure 9B:
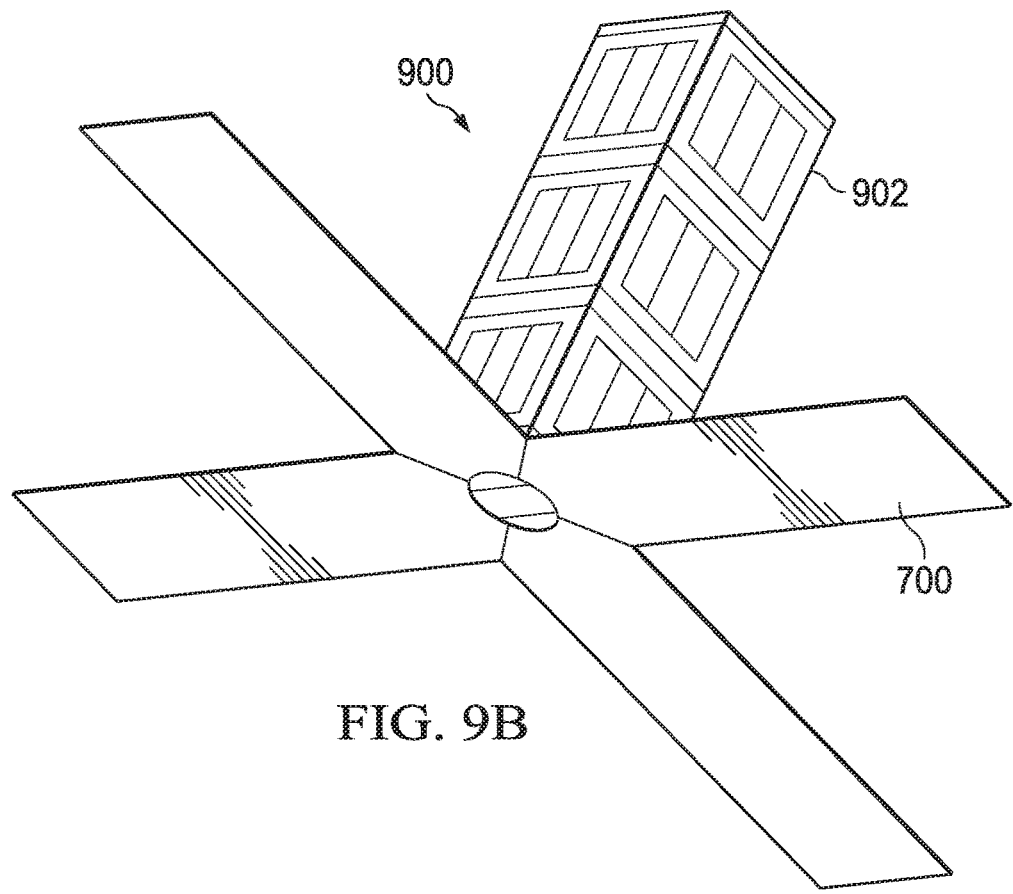

FIGS. 9A and 9B illustrate an additional example use of an integrated thermal energy transport and storage structure in accordance with this disclosure. In particular, FIGS. 9A and 9B illustrate one example way in which the integrated thermal energy transport and storage structure 700 described above may be used. Note, however, that the integrated thermal energy transport and storage structure 700 may be used in any other suitable manner.

In this example, a system 900 includes a satellite 902 having one or more deployable radiators, each of which is implemented using an instance of the integrated structure 700. In this particular example, the satellite 902 represents a three-unit cube satellite, although any other suitable satellite or other space vehicle may be used here. Also, in this particular example, the system 900 includes four deployable radiators, although other numbers of deployable radiators (including a single radiator) may be used here.

In a first state shown in FIG. 9A, the deployable radiators have a first shape and generally conform to an outer surface of the satellite 902. This state may be referred to as a stowed configuration since it is typically used prior to deployment of the satellite 902 (as it reduces the overall size of the satellite 902). In a second state shown in FIG. 9B, the deployable radiators have a second shape and generally extend away from the satellite 902. This state may be referred to as a deployed configuration since it is typically used after deployment of the satellite 902 (as it increases the total surface area of the radiators pointing in a thermally advantageous direction). Once the radiators are deployed, the radiators can be pointed in one or more suitable directions (such as into deep space), enabling heat rejection for radiating thermal energy generated by the satellite 902.

In some embodiments, the radiators can be deployed passively, such as based on thermal energy generated by the satellite 902 after deployment. This thermal energy can be transported through the radiators, such as by one or more thermal energy transfer devices like one or more oscillating heat pipe circuits 714a. In other words, the deployment of the radiators can be based on the waste heat being rejected using the radiators. This allows the radiators to be passively activated using waste heat from one or more electrical components, power supplies, or other components of the satellite 902, As long as there is thermally-conductive communication between one or more heat sources and the heat input regions 706 of the deployable radiators, waste heat can be transferred, such as via the oscillating heat pipe circuits 714a, to the morphable regions 708. The waste heat can therefore supply the necessary impulse to transform the morphable regions 708 from the first state in FIG. 9A to the second state in FIG. 9B. As a particular example, in some cases, the radiators can be deployed based on an initial high burst of thermal energy from the components of the satellite 902.

In other embodiments, the radiators can be deployed actively, such as based on thermal energy obtained or generated by the satellite 902 specifically for extending the radiators after deployment. Thus, for example, one or more heaters 720 can actively generate thermal energy that causes the radiators to extend, or incident or reflected electromagnetic radiation (possibly focused) can be received through one or more feed ports 722 to cause the radiators to extend. If used, electromagnetic radiation can be obtained from any suitable source(s), such as one or more lasers, LEDs, or solar collectors. Once the radiators have been extended, waste heat from one or more electrical components, power supplies, or other components of the satellite 902 can be rejected to an external environment.

In addition to supporting the rejection of thermal energy from the satellite 902, each of the deployable radiators here is configured to change shape and simultaneously store energy, such as during a temperature excursion. This allows the deployable radiators to function in a dual-use manner as an actuator and as a thermal energy storage device.

In many cases, outer mold line requirements of a flight vehicle or other platform are defined by pre-operation storage and system mechanical packaging considerations and constrain the SWaP of a thermal management system. This includes the surface area for primary waste heat rejection to an external environment, as well as the volume and weight of thermal transport, heat exchange, and possibly thermal storage components. As a result of dynamic environmental conditions, system-level cooling capabilities of a baseline thermal management system may continuously change during use, which can influence platform capability along a prescribed trajectory or necessitate deployment of additional heat rejection areas or on-demand heat storages.

Also, in many cases, increasing the steady-state thermal transport capabilities of a system and/or providing measures to temporarily absorb heat in excess of rejection capabilities help to ensure system performance and reliability over a wider operational envelope. For example, straight fins/strakes and deployable radiators may be employed to increase the amount of exposed surface area, in effect increasing the steady-state heat rejection capability of the system. As another example, intrinsic material properties such as heat capacity (sensible heating) and phase change (latent heating) offer an increased temporary buffer, extending system performance during brief periods of duress. However, the timeframe of cooling relief is limited by the volume of heat storage material included in the system.

The structure 700 here helps to reduce the size and weight used for thermal transport and storage in the various ways described above. External straight fins/strakes are limited by storage and operational factors, and actively deployable radiators require support infrastructure such as power, deployment mechanisms, harnessing, and electronics. Also, while increasing steady-state capacity, the use of additional thermal storage modules filled with a phase change material often requires continuous and/or thermally-linked volumes of material for maximal effectiveness, introducing constraints and challenges for mechanical packaging.

Various embodiments of the structure 700 help to avoid these issues by integrating thermal energy storage directly into a thermally-enhanced waste heat rejection surface. That is, a waste heat rejection surface (static as in FIG. 6 or deployable as in FIGS. 9A and 9B) is constructed using one or more shape-memory materials or other materials exhibiting solid-solid phase transformations integrated with one or more thermal energy transfer devices. This helps to maintain efficient system waste heat rejection capabilities in steady-state operational envelopes while extending system operating periods when confronting corner cases or strenuous regions outside of these operational envelopes. In effect, this approach reduces the number of components (lowering SWaP) and simplifies the cooling architecture without sacrificing system capabilities to meet stringent performance requirements.

Although FIGS. 9A and 9B illustrate an additional example use of an integrated thermal energy transport and storage structure, various changes may be made to FIGS. 9A and 9B. For example, while FIGS. 9A and 9B illustrate one way in which the structure 700 described above can be used or implemented, the structure 700 can be used in any other suitable manner. Also, there are various ways in which the structure 700 described above can be passively or actively triggered to change shape, including the use of thermal energy originating from one or more components internal to a system or from an external environment, the use of incident or reflected solar radiation, and the use of actively-generated thermal energy. In general, any suitable mechanisms or techniques can be used to trigger a temperature excursion used to cause a shape change in one or more instances of the structure 700.

Figure 10:
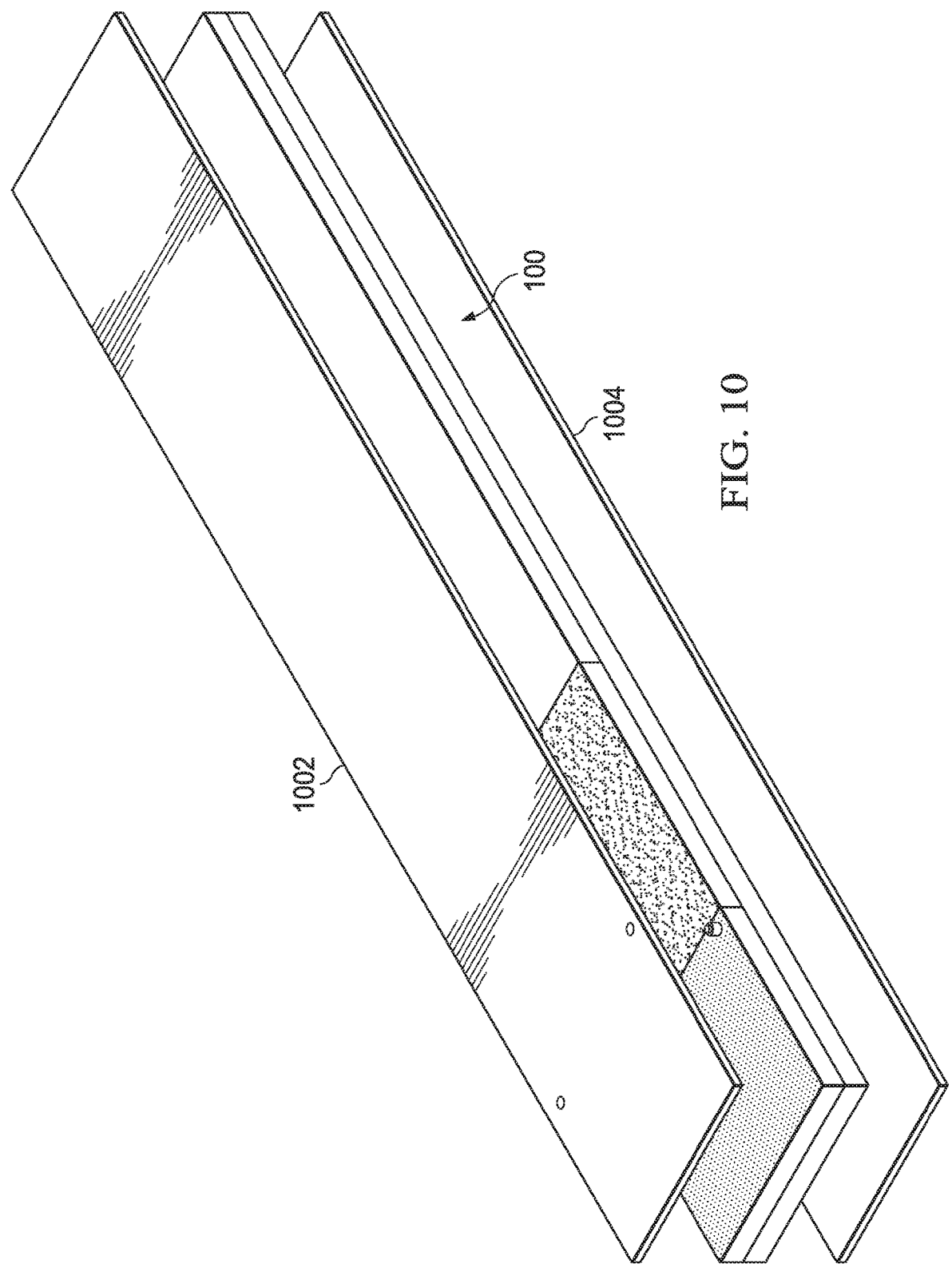
FIG. 10 illustrates an example reinforcement of an integrated thermal energy transport and storage structure in accordance with this disclosure.

FIG. 10 illustrates an example reinforcement of an integrated thermal energy transport and storage structure in accordance with this disclosure. For ease of explanation, the reinforcement shown in FIG. 10 is described as being used with the integrated thermal energy transport and storage structure 100 of FIG. 1, However, the same or similar reinforcement may be used with the structure 300, the structure 700, or any other suitable integrated thermal energy transport and storage structure designed in accordance with this disclosure.

As shown in FIG. 10, an integrated thermal energy transport and storage structure 100 can be sandwiched between two skins 1002-1004. The skins 1002-1004 represent thin plates or other thin components that can be attached to the structure 100 in order to increase the bending strength and stiffness of the structure 100. This type of approach enables the design of components such as structural monocoque thermal protection skins or thermal protection carriers in accordance with ANSI/VITA 46.0 standards or other designs.

The skins 1002-1004 can be formed from any suitable material(s), such as such as steel; titanium; aluminum; carbon fibers, reinforced carbon fibers, or other high-strength, relatively low-density material(s); or any other suitable material(s). The skins 1002-1004 can also be attached to the structure 100 in any suitable manner, such as laser welding, brazing, friction stir welding, ultrasonic welding, diffusion bonding, adhesives, mechanical connections like bolts, or other suitable techniques. In addition, each of the skins 1002-1004 can have any suitable size, shape, and dimensions.

Although FIG. 10 illustrates one example of a reinforcement of an integrated thermal energy transport and storage structure, various changes may be made to FIG. 10. For example, any other suitable reinforcement may be used with an integrated thermal energy transport and storage structure, or no reinforcement may be needed with an integrated thermal energy transport and storage structure.

Figure 11:
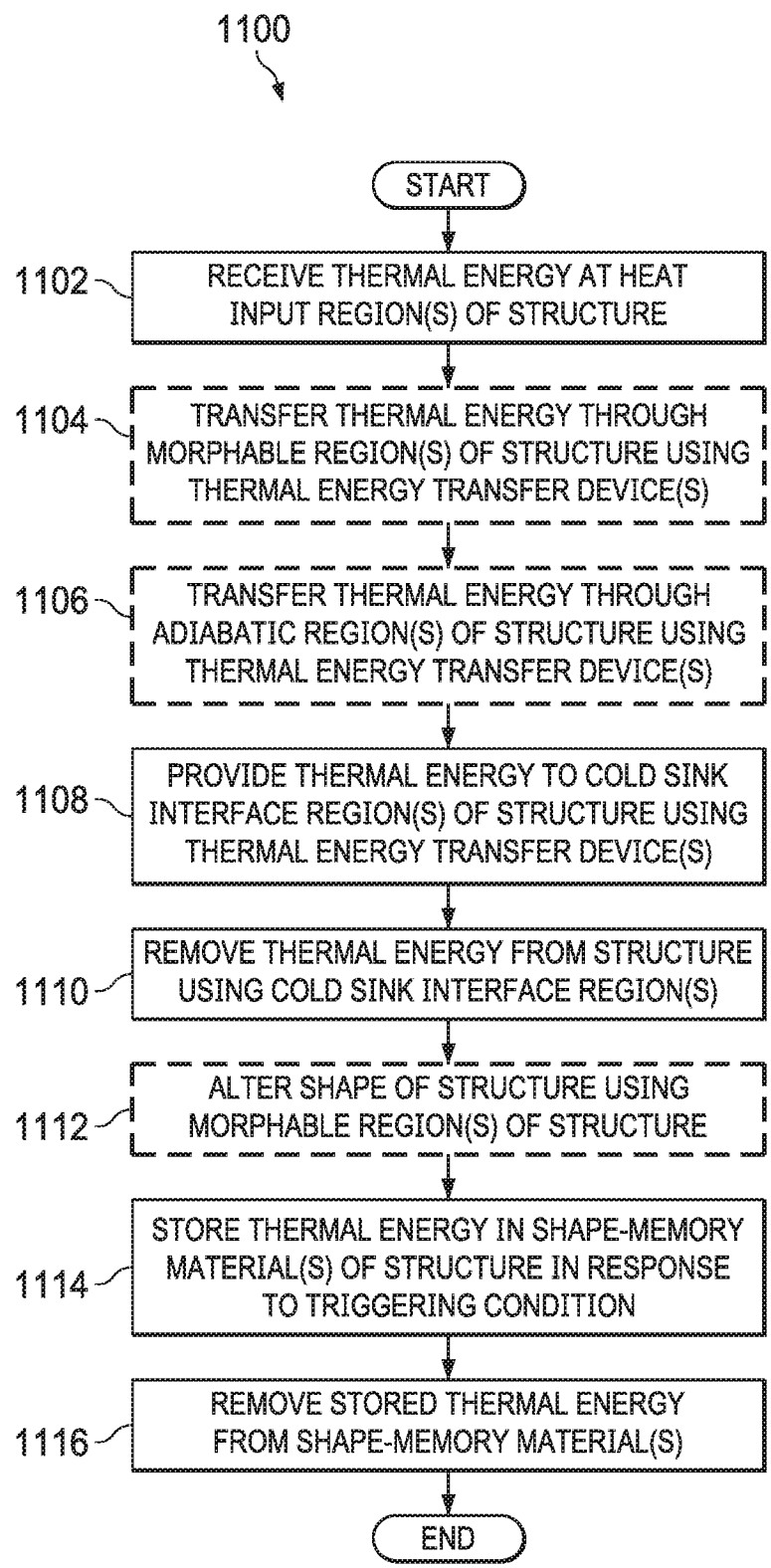
FIG. 11 illustrates an example method for using an integrated thermal energy transport and storage structure in accordance with this disclosure.

FIG. 11 illustrates an example method 1100 for using an integrated thermal energy transport and storage structure in accordance with this disclosure. For ease of explanation, the method 1100 is described as involving the use of the structure 100, 300, or 700 described above. However, the method 1100 can involve the use of any suitable structure designed in accordance with this disclosure.

As shown in FIG. 11, thermal energy is received at one or more heat input regions of a structure at step 1102. This may include, for example, thermal energy from one or more heat sources 108 being received at the heat input region(s) 102, 306, 706 of the structure 100, 300, 700. The thermal energy is optionally transferred through one or more morphable regions of the structure at step 1104 and/or through one or more adiabatic regions of the structure at step 1106 using at least one thermal energy transfer device. This may include, for example, one or more thermal energy transfer devices 202, 202a-202b or one or more oscillating heat pipe circuits 312a, 714a transferring the received thermal energy through the morphable region(s) 708 and/or through the adiabatic region(s) 104, 308, 710 of the structure 100, 300, 700. The use of the morphable region(s) and/or the use of the adiabatic region(s) is optional since the structure may not require any macrostructural shape changes using any morphable regions or structural support, reinforcement, or extended heat transport using any adiabatic regions.

The thermal energy is provided to one or more cold sink interface regions of the structure using the at least one thermal energy transfer device at step 1108. This may include, for example, the one or more thermal energy transfer devices 202, 202a-202b or one or more oscillating heat pipe circuits 312a, 714a transferring the thermal energy to the cold sink interface region(s) 106, 310, 712 of the structure 100, 300, 700. The thermal energy is removed from the structure using the one or more cold sink interface regions of the structure at step 1110. This may include, for example, the cold sink interface region(s) 106, 310, 712 of the structure 100, 300, 700 emitting the thermal energy into the surrounding environment, providing the thermal energy to a heat sink, or otherwise rejecting the thermal energy.

A shape of the structure is optionally altered using one or more morphable regions of the structure at step 1112. This may include, for example, one or more shape-memory materials of the morphable region(s) 708 being heated, such as by the thermal energy being received by the structure 100, 300 700 and transported through the one or more thermal energy transfer devices 202, 202a-202b or one or more oscillating heat pipe circuits 312a, 714a or by thermal energy from a heater 720 or feed port 722. This may also include the one or more shape-memory materials of the morphable region(s) 708 changing shape by returning to a programmed shape. In this way, the morphable region(s) 708 can be passively or actively triggered.

In response to a triggering condition (such as a temperature excursion associated with a thermal transient event), excess thermal energy that cannot be safely transported or rejected by the structure is stored in the shape-memory material(s) of the structure at step 1114. This may include, for example, the shape-memory material(s) in at least some of the thermomechanical regions 102-106, 306-310, 706-712 storing excess thermal energy that cannot be transported through the one or more thermal energy transfer devices 202, 202a-202b or one or more oscillating heat pipe circuits 312a, 714a and rejected by the structure 100, 300, 700. Note that this may occur for various reasons, such as when a heat source 108 begins generating an excessive amount of thermal energy or when an ambient environment around the structure 100, 300, 700 experiences excessive heating due to aerodynamic drag, solar loading, or other causes. If and when the triggering condition ends, the stored thermal energy is removed from the shape-memory material(s) of the structure at step 1116. This may include, for example, the one or more thermal energy transfer devices 202, 202a-202b or one or more oscillating heat pipe circuits 312a, 714a of the structure 100, 300, 700 receiving at least some of the stored thermal energy from the shape-memory material(s) and transporting the thermal energy to the cold sink interface region(s) 106, 310, 712 of the structure 100, 300, 700. This may also include the shape-memory material(s) transporting at least some of the stored thermal energy to the cold sink interface region(s) 106, 310, 712 of the structure 100, 300, 700.

Although FIG. 11 illustrates one example of a method 1100 for using an integrated thermal energy transport and storage structure, various changes may be made to FIG. 11. For example, while shown as a series of steps, various steps in FIG. 11 can overlap, occur in parallel, occur in a different order, or occur any number of times. Also, as noted above, there are various ways in which a structure can be passively or actively deployed to change shape, and any of these approaches can be used in FIG. 11 (or no macrostructural shape change may occur). In addition, the steps shown in FIG. 11 can occur with any desired number of integrated thermal energy transport and storage structures (either sequentially or concurrently).

Note that various physical mechanisms allow thermal energy to be removed from deployable radiators and other structures described in this patent document. These physical mechanisms include radiation, convection, and conduction of thermal energy. Depending on the design of a structure and depending on the external environment around the structure, thermal energy may be removed from the structure via radiation, convection, or conduction (or any suitable combination thereof). The term "reject" and its derivatives encompass all of these physical mechanisms for removing thermal energy from a structure. Thus, a cold sink interface region of a structure can be used to reject thermal energy from the structure via at least one of radiation, convection, and conduction.

It may be advantageous to set forth definitions of certain words and phrases used throughout this patent document. The terms "include" and "comprise," as well as derivatives thereof mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(1) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a structure configured to receive and transport thermal energy, wherein the structure comprises:
one or more materials configured to undergo a solid-solid phase transformation at a specified temperature or in a specified temperature range, the one or more materials forming a heat input region configured to receive the thermal energy, a cold sink interface region configured to reject the thermal energy, and an adiabatic region disposed between the heat input region and the cold sink interface region, the adiabatic region configured to provide structural support or reinforcement while at least substantially preventing heat transfer to and from an external environment; and
one or more thermal energy transfer pipes embedded in at least part of the one or more materials, the one or more thermal energy transfer pipes configured to transfer the thermal energy throughout the one or more materials and at least partially between the heat input region and the cold sink interface region;
wherein the one or more materials are also configured to absorb and store excess thermal energy in response to a temperature excursion associated with a thermal transient event and to release the stored thermal energy after the thermal transient event.

2. The apparatus of claim 1, wherein the thermal transient event comprises an event that causes the structure to receive at least a portion of excess thermal energy that exceeds a thermal energy rejection capability of the structure.

3. The apparatus of claim 1, wherein:
the one or more thermal energy transfer pipes comprise multiple thermal energy transfer pipes; and
the structure further comprises at least one thermally conductive material adjacent and between the multiple thermal energy transfer pipes.

4. The apparatus of claim 1, wherein the one or more materials are further configured to absorb and store thermal energy received through the cold sink interface region.

5. The apparatus of claim 1, wherein the one or more materials further form a morphable region configured to change shape.

6. The apparatus of claim 1, wherein the regions formed by the one or more materials have non-uniform dimensions.

7. The apparatus of claim 1, wherein each of the one or more thermal energy transfer pipes comprises one of: a heat pipe and a thermally-conductive material.

8. The apparatus of claim 1, further comprising:
a heat sink thermally coupled to the cold sink interface region, the heat sink configured to receive the thermal energy from the structure.

9. The apparatus of claim 1, further comprising:
skins positioned on opposing sides of the structure and configured to increase a bending strength and a stiffness of the apparatus.

10. The apparatus of claim 1, wherein the one or more materials comprise one or more shape-memory materials.

11. A system comprising:
a flight vehicle comprising at least one heat source; and
one or more structures configured to remove thermal energy from the at least one heat source;
wherein each of the one or more structures comprises:
one or more materials configured to undergo a solid-solid phase transformation at a specified temperature or in a specified temperature range, the one or more materials forming a heat input region configured to receive the thermal energy, a cold sink interface region configured to reject the thermal energy, and an adiabatic region disposed between the heat input region and the cold sink interface region, the adiabatic region configured to provide structural support or reinforcement while at least substantially preventing heat transfer to and from an external environment; and
one or more thermal energy transfer pipes embedded in at least part of the one or more materials, the one or more thermal energy transfer pipes configured to transfer the thermal energy throughout the one or more materials and at least partially between the heat input region and the cold sink interface region; and
wherein the one or more materials are also configured to absorb and store excess thermal energy in response to a temperature excursion associated with a thermal transient event and to release the stored thermal energy after the thermal transient event.

12. The system of claim 11, wherein the thermal transient event comprises an event that causes at least one of the one or more structures to receive at least a portion of excess thermal energy that exceeds a thermal energy rejection capability of the structure.

13. The system of claim 11, wherein, in each of at least one of the one or more structures:
the one or more thermal energy transfer pipes comprise multiple thermal energy transfer pipes; and
the structure further comprises at least one thermally conductive material adjacent and between the multiple thermal energy transfer pipes.

14. The system of claim 11, wherein, in each of at least one of the one or more structures, the one or more materials are further configured to absorb and store thermal energy received through the cold sink interface region.

15. The system of claim 11, wherein, in each of at least one of the one or more structures, the one or more materials further form a morphable region configured to change shape.

16. The system of claim 11, wherein, in each of at least one of the one or more structures, the regions formed by the one or more materials have non-uniform dimensions.

17. The system of claim 11, wherein, in each of at least one of the one or more structures, the cold sink interface region is coupled to a portion of the flight vehicle.

18. The system of claim 11, wherein each of at least one of the one or more structures further comprises:
skins positioned on opposing sides of the structure and configured to increase a bending strength and a stiffness of the structure.

19. The system of claim 11, wherein the one or more materials comprise one or more shape-memory materials.

20. A method comprising:
receiving thermal energy at a structure, the structure comprising one or more materials configured to undergo a solid-solid phase transformation at a specified temperature or in a specified temperature range, the one or more materials forming a heat input region configured to receive the thermal energy, a cold sink interface region configured to reject the thermal energy, and an adiabatic region disposed between the heat input region and the cold sink interface region, the adiabatic region configured to provide structural support or reinforcement while at least substantially preventing heat transfer to and from an external environment;
transferring the thermal energy throughout the one or more materials and between the heat input region and the cold sink interface region using one or more thermal energy transfer pipes embedded in at least part of the one or more materials;
in response to a temperature excursion associated with a thermal transient event, absorbing and storing excess thermal energy in the one or more materials; and
after the thermal transient event, releasing the stored thermal energy from the one or more materials.

* * * * *